United States Patent
Markman et al.

(10) Patent No.: US 12,099,892 B2
(45) Date of Patent: Sep. 24, 2024

(54) RFID MULTI-READ PORTAL

(71) Applicant: Fujitsu Frontech North America, Inc., Foothill Ranch, CA (US)

(72) Inventors: Herbert Markman, Wynnewood, PA (US); Aaron Teter, King of Prussia, PA (US); Daniel G. Dalton, Laguna Beach, CA (US)

(73) Assignee: Fujitsu Frontech North America, Inc.

( * ) Notice: Subject to any disclaimer, the term of this patent is extended or adjusted under 35 U.S.C. 154(b) by 690 days.

(21) Appl. No.: 17/121,516

(22) Filed: Dec. 14, 2020

(65) Prior Publication Data
US 2022/0188529 A1    Jun. 16, 2022

(51) Int. Cl.
| | | |
|---|---|---|
| G06K 7/10 | (2006.01) | |
| G06F 16/174 | (2019.01) | |
| G06K 19/07 | (2006.01) | |
| G06Q 20/20 | (2012.01) | |
| G06Q 20/32 | (2012.01) | |
| G07C 9/27 | (2020.01) | |

(Continued)

(52) U.S. Cl.
CPC ..... *G06K 7/10297* (2013.01); *G06F 16/1748* (2019.01); *G06K 19/0725* (2013.01); *G06Q 20/208* (2013.01); *G06Q 20/3278* (2013.01); *G07C 9/27* (2020.01); *G07C 9/28* (2020.01); *G07C 9/29* (2020.01); *G06K 2007/10504* (2013.01)

(58) Field of Classification Search
CPC ........... G06K 7/10297; G06K 19/0725; G06K 2007/10504; G06F 16/1748; G06Q 20/208; G06Q 20/3278; G07C 9/27; G07C 9/28; G07C 9/29; G07C 9/20; G08B 13/2402; G08B 13/246; G07G 1/009

See application file for complete search history.

(56) References Cited

U.S. PATENT DOCUMENTS

| | | | |
|---|---|---|---|
| 2009/0184802 A1* | 7/2009 | Park | G06K 17/0029 340/10.1 |
| 2018/0004992 A1 | 1/2018 | Jacobsen | |

(Continued)

OTHER PUBLICATIONS

International Search Report and Written Opinion of the USPTO as International Searching Authority 'Form PCT/ISA/210, 220, and 237), issued in connection with counterpart PCT Application No. PCT/US21/72873 mailed Mar. 8, 2022, 22 pages.

*Primary Examiner* — A. Hunter Wilder
(74) *Attorney, Agent, or Firm* — Fujitsu Intellectual Property Center; Tiep H. Nguyen; Scott A. Elchert

(57) ABSTRACT

A system and method for multi-reading RFID codes is disclosed. The system may comprise a portal, a RFID reader, an entrance sensor, an exit sensor and a controller. The controller is configured to receive the RFID code data and the read timestamp for each article, receive the start trigger timestamp and the stop trigger timestamp, determine a read area time range based on the start trigger timestamp and the stop trigger timestamp, determine an active read area timeframe based on the read area time range as adjusted by a pre-read offset and a post-read offset, associate RFID code data with the first group if the read timestamp associated with the RFID code data occurred during the active read area timeframe, and process the RFID code data of the first group and transmit a result of the processing of the first group to an output interface.

20 Claims, 12 Drawing Sheets

(51) Int. Cl.
*G07C 9/28* (2020.01)
*G07C 9/29* (2020.01)

(56) References Cited

U.S. PATENT DOCUMENTS

| | | |
|---|---|---|
| 2018/0247092 A1 | 8/2018 | Khojastepour et al. |
| 2020/0226331 A1* | 7/2020 | Khojastepour .... G06K 7/10356 |
| 2020/0265661 A1* | 8/2020 | Khojastepour .......... G07C 9/28 |

* cited by examiner

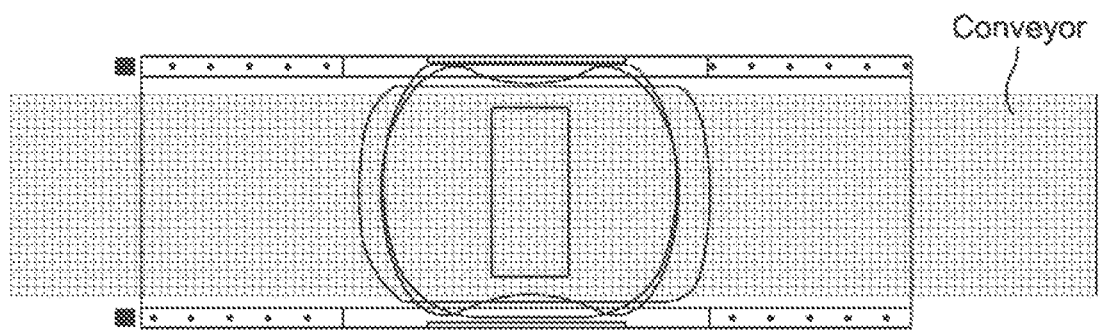
FIG. 3
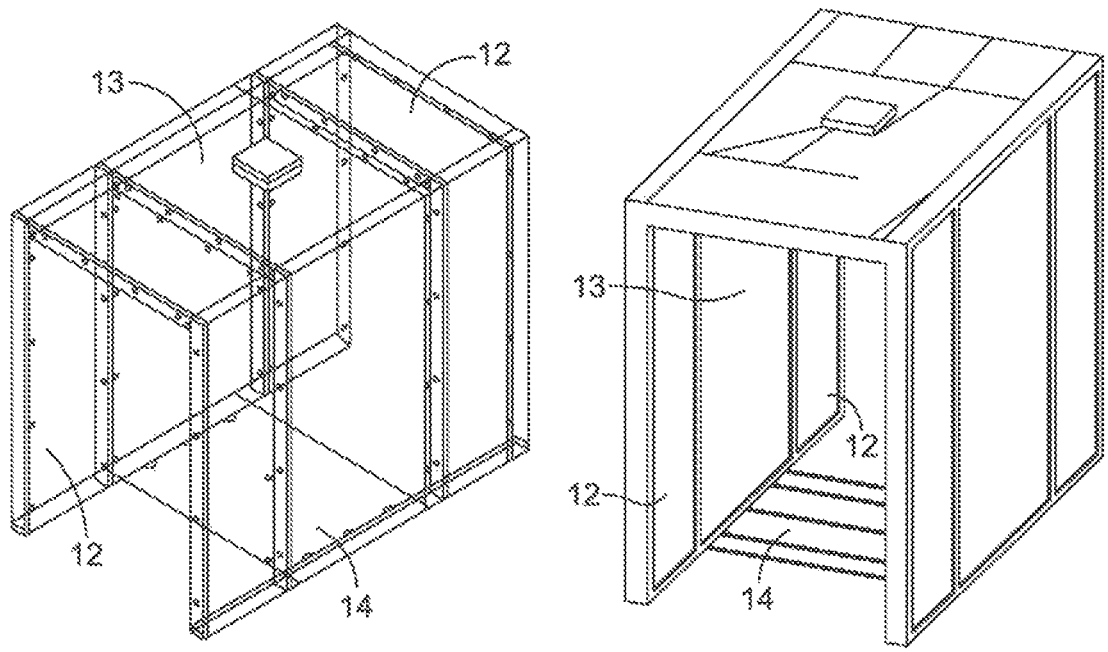
FIG. 4
FIG. 5

RFID MULTI-READ PORTAL

TECHNICAL FIELD

This disclosure relates to the field of readers for Radio Frequency Identification (RFID) tagged articles, in particular multi-read RFID tags in a group or batch of articles.

BACKGROUND

Several aspects have been employed individually and in combination in the art, for concentrating electromagnetic interaction between the RFID tags and one or more RFID antennas that are directed at the reading zone of a portal. An RFID multi-read portal, which is useful for reading articles manually carried into the reading zone or moved in on a cart, wheeled bin, shopping cart, garment hanging device or the like while minimizing interaction with tags associated with articles that may be located nearby but are not members of the group, has been sought to be provided. The group being a plurality of RFID tagged articles located in proximity with one another, for example being encompassed by a carrying bag, disposed in a movable cart or bin, carried on a discrete length of conveyor or similar conveyance, or otherwise arranged together while passing through a reading zone of a portal.

Disclosed methods and apparatus in the art include partial enclosures lined with reflective surfaces that may be shaped to focus on the reading zone, adjacent electromagnetic signal damping structures containing lossy materials and optionally outwardly faced with reflective sheets, all arranged to restrict and attenuate propagation of signals outside of the reading zone and to elongate propagation paths. Additionally, variable control of RFID read/write signal levels and timing, in conjunction with sensing and signaling, have been disclosed for controlling one or more factors such as the RF power density and the residence time of a group of RFID multi-read tag encoded items moving through a reading enclosure or along a transit path intersecting the reading zone of a portal.

In order to read passive UHF RFID tags in a group, a sufficient RF power density is needed to interact with each of the tags. This includes power to charge each RFID tag and also to communicate with the RFID tag during a polling procedure. While it may be possible to enhance RF power levels and/or to extend the interaction time to aid in this process, this may increase the risk of unwanted interaction with tags outside of the group.

Furthermore, RFID tags may be carried on articles that are densely arranged, such as in a pile or stack or hanger rack or otherwise adjacent state. Previously, reading densely placed tags has been done using a high or maximum possible power level to interrogate the tags and a high or maximum sensitivity RFID antenna configuration to discern responses. The process of illuminating (charging) the tags and detecting responses in an open environment risks incidental interactions over too large an area or volume, potentially encompassing RFID tags that are not part of the group of RFID tags under scrutiny. For example, nominal RFID tag reading levels may be sufficient to interact with tags at a range of 20 feet (6 meters) or if conditions are ideal along a direct line of sight, even at 50 feet (15 m).

A fully encompassing conductive enclosure can limit interaction to the tags located within the enclosure, but may be unsuitable for some applications. A high RF power density can be applied safely if an enclosure is well shielded electromagnetically, without interacting with tags outside of the enclosure. For example, a shielding enclosure can comprise a conductive hollow box with conductive shielding doors that can be closed to create an internally reflective reading area in which the tags are placed. Thus, interactions with tags is confined to the volume within the conductive box. The power level and residence time can be more than sufficient without unwanted external tag interactions. See, for example, U.S. Pat. No. 9,760,826, the full disclosure of which is hereby incorporated by reference, addressing these issues.

U.S. Pat. No. 9,760,826 discloses techniques for limiting unwanted interaction with RFID tags outside of the enclosure by providing conductively sheathed walls along a transit path leading into and optionally beyond an enclosure containing RFID antennas. Thus, an elongated shielded vestibule includes conductive sidewalls and optionally top and bottom conductive walls along incoming and outgoing transit paths. Batches or groups of tagged articles reside for a time in a central reading zone that is substantially enclosed and where RFID antennas are mounted in indented niches. The incoming and outgoing paths can define a relatively long signal propagation path that is angled or curved to necessitate reflections, precluding direct line of sight signal pathways between the RFID antennas in the enclosure and "stray" RFID tags incidentally located outside of the disclosure. These provisions are effective in an industrial setting but can be claustrophobic and confining in other settings where an open plan is preferable, such as a retail checkout. Reading RFID tags in open settings raises the risk of interacting with stray RFID tags, detracting from the accuracy of article accounting, inserting errors as to which articles actually are present within a defined body of inventory, requiring safeguards when adding up cash register receipts if the reading is at point of sale, etc. There are aesthetic reasons to have an open reading apparatus but functional reasons to require enclosing the reading zone.

U.S. Pat. No. 10,783,339 (the '339 Patent) issued Sep. 22, 2020, the full disclosure of which is hereby incorporated by reference, discloses arranging the interrogation and response signaling of RFID antennas, to permit robust and sufficient signal amplitude and/or residence timing to read multi-read RFID tags in successive groups effectively while minimizing the risk of interaction with "stray" RFID tags that are not members of the groups. In other word, the '339 Patent uses RF power density and interaction times that may be minimally sufficient for charging (interrogating) and/or reading responses of the tags in the group, so that the codes of most or all of the tags that are present in the group are discerned successfully, while discriminating against unwanted interaction with tags that may be located nearby but are not members of that group. For this purpose, structural arrangements and materials are provided at the reading zone and defining entry and/or exit vestibules/portals including one or more of electromagnetically reflective surfaces that focus upon and enhance tag charging and signaling effects confined to a reading zone; likewise reflective vestibule structures that limit propagation outside the reading zone to indirect crisscross paths, to elongate signal propagation path lengths between the reading zone and external zones; and, selectively placed electromagnetically lossy absorptive materials along the vestibules, including thicknesses and surface facings that attenuate operational RF frequencies. The '339 Patent discloses a multi-read RFID tag reading apparatus that can be of modest size, open on both ends without unduly interacting with stray RFID tags, and useful in various applications including retail checkout lines, garment rack readers, textile processing lines and the like.

SUMMARY OF THE DISCLOSURE

Disclosed herein is a system and method that allows reading of groups of RFID tags on articles with a high degree of dependability when the articles are carried through or move through a portal in, for example, bags or rolling carts or other. The disclosed apparatus and methods maintain a high enough RF density to enable high speed discernment of the RFID codes of numerous tags arranged in a dense manner. Embodiments are disclosed that allow reading RFIDs of many hundreds of items, such as textile items loaded atop one another in bags or bins, and without inclusion of tags outside of the desired group being processed as if they were part of the group.

The tagged items, bags, carts or containers can be moved manually while transiting the portal read area at a normal walking pace or carried on a conveyor or other powered carrier.

The read and write RFID antennas are disposed so as to concentrate interrogation and response RF energy to the limited volume within the walk-through or otherwise transited enclosure. This can include placing plural RFID antennas in niches structured of reflective conductive material, directing electromagnetic energy to and from the reading zone by directional signal emission and directional antenna sensitivity applied to the reading zone. This may also include the use of concave reflective structures carrying the RFID antennas, and optionally may comprise more sophisticated arrangements to confine and direct electromagnetic energy to the RFID antennas, such as parabolic concentrators, Fresnel reflector segments, and/or meta-material waveguide structures.

The approaches to and from the enclosure (referred to herein as a "vestibule" or "portal") may be configured on one or more of the sides (and the bottom (if present) and/or the top (if present)) to limit the propagation of RF energy between the RFID antennas and outside stray RFID tags, especially RFID tags on miscellaneous items of stock that are shelved nearby in a retail store or being carried or carted about by other customers. This is accomplished by one or more of requiring reflections that elongate the signal path propagation length, and/or ensuring that signals in the vestibules/portals are incident on lossy dielectric material thicknesses or frequency specific stopband attenuation traps such as Salisbury surfaces. According to certain embodiments, an RF absorbent sidewall structure is placed along the inner facing surfaces of the vestibules/portals and contains an electromagnetically absorbent lossy material. Advantageous absorbent materials include carbon loaded foam, rubber material with embedded graphite or ferromagnetic particulate inclusions such as ferrite. In one embodiment, inward facings or thicknesses of the vestibule/portal walls have absorbent and/or stopband materials or structures, and outward thicknesses or backsides of the walls are conductive so as to reflect inwardly, e.g., having a reflective film surface.

The Salisbury screen is a known approach to achieving RF-absorption at a distinct narrow frequency stopband. U.S. Pat. No. 2,599,944 ABSORBENT BODY FOR ELECTROMAGNETIC WAVES ("Salisbury," the disclosure of which is incorporated herein by reference) describes such a structure. A composite material structure damping electromagnetic propagation is mounted on the conductive wall surfaces of an enclosure, as applied to the present disclosure placed on vestibule/portal walls between the inner reading zone and the outside, to render those surfaces electromagnetically non-reflective at a frequency band determined by the dimensions of the composite material structure. Other approaches may include, carbon loaded RF attenuating foams, composite rubber ferrite materials, or similar structures or materials. The extent of conductive particulate or dielectric loading is preferably sufficient to attenuate RF signals incident on the vestibule/portal walls to preclude interaction with stray RFID tags located beyond a given range, e.g., one to three meters. Attenuation of reflected signal strength at the vestibule/portal walls is used together with clamshell reflective structures at the RFID antennas, generally directing propagation laterally across the reading zone as opposed to longitudinally or obliquely down the pathway between the vestibule walls.

According to certain embodiments of the present disclosure, the frequency band or bands to be damped include at least the RFID UHF read/response frequency of the tags. The surfaces carrying the composite structure may include at least one side wall of a vestibule/portal leading into the reading zone. In some alternative embodiments, the composite may be included along both opposite side walls, as well as the top (if present) and bottom (if present) of the vestibule/portal and/or the RFID antenna enclosure and vestibule/portal may be comprised of reflective materials placed in such a way as to ensure the majority of reflected energy is re-directed back into the reading zone.

The Salisbury patent discloses a composite of graphite-coated canvas (which is conductive), spaced apart from a metal back surface (i.e., a conductive ground plane) by wood blocks. The spacing determines the frequency that is absorbed. An advantageous spacing is approximately a quarter wavelength ($\lambda/4$). Circuit and transmission line theories can show that the ground plane, which is a short circuit ($\approx 0\Omega$ impedance), is transformed to an open circuit ($\approx \infty \Omega$ impedance) at ($\lambda/4$) distance from the ground plane. By placing the resistive sheet at the ($\lambda/4$) spacing, a $377\Omega$ impedance is disposed in parallel with the reflected open circuit. This results in a structure in which an incident plane RF wave, which has a $377\Omega$ impedance in free space, is matched to the $377\Omega$ load sheet. Ideally, the composite totally absorbs the incident wave's energy. Little or no energy propagates by reflection from the composite, in either direction between the reading zone and articles that are outside. It is likewise possible to produce the same effect with other specific structures, such as a conductive film layer of carbon or graphite loaded material on the inner side of the vestibule/portal wall (like the Salisbury graphite coated canvas), spaced by a nonconductive plastic spacing layer (functionally similar to the Salisbury wood spacers), from a conductive backplane formed by a reflective film.

Electromagnetic signal strength is attenuated according to the inverse square of the propagation distance. The attenuation achieved adding a Salisbury or other damping material and configurations has an attenuating effect similar elongating the propagation path, especially the length over indirect (reflected) propagation paths. The desired extent of signal attenuation, namely sufficient to prevent or minimize RF from exiting the vestibule/portal at effective signal strength to interact with stray RFID tags, preferably is achieved in part by the geometric configuration of the vestibule/portal watts. Relatively narrow transverse vestibule/portal wall spacing tends to lengthen the available longitudinal and oblique (reflected) path lengths and prevent direct line of sight paths between stray RFID tags outside and points from which signals originate or are reflected. Geometric arrangement alone or together with attenuating damping materials, are such that RF propagation from the RFID antennas to stray RFID tags outside the portal is attenuated to the extent that stray tag reading is rendered ineffective, for example within a predetermined range, for example one to ten meters, preferably a range beyond three or four feet (1.0 to 1.3 m). According to the disclosed embodiments, attenuation between the antennas and stray tags is obtained by at least 10 dB, by preventing direct line of sight between the antennas and the non-target stray tag population and causing reflections that lengthen the signal path prior to encountering non-target tags attenuation may also be achieved without the use of lossy absorbers, and vice versa. According to exemplary embodiments, both geometry and lossy absorbers and/or bandstop arrangements can be employed to obtain the desired attenuation of at least 10 dB and potentially 20 dB if optimized.

The approach disclosed in the '339 Patent achieves an effective high tag reading success rate and an advantageously low rate of interaction with stray tags. These are achieved by employing one or more or all of a Salisbury type material, other RF absorptive materials or structures, and by manipulating the RF power direction and shape, both as to direct and reflected RF energy, through the use of radiation pattern manipulation, reflections, and absorption, (using for example a Salisbury screen and other lossy materials dimensioned to complement the tag read/response RF energy and incorporated into the overall shape of the outer walls of the reading portal). When combined with a RFID reader that is constantly in the Active State (defined herein in the Detailed Description), an even more effective high tag reading success rate can be achieved for a group while still having the low rate of interaction with stray tags because the benefits of the other are maintained while the time between the receipt of a start trigger and the ramping up to full power to interrogate the RFID tags is eliminated.

These and other objects are accomplished in a portal that includes a RFID reader that reads multiple associated RFID tags on articles in groups moved through an RFID Observable Area, and including interrogation/charging and receiving/detection RFID antennas concentrated on the reading zone but also reading in a Bleed Area (defined herein in the Detailed Description) outside of the read zone and physical portal. The articles are movable through a passage and can be read when paused or moving. The passage has a conductive wall at the reading zone that homogeneously distributes RF energy over the articles therein, and may have a vestibule into and/or out of the reading zone, preferably configured to attenuate reflected electromagnetic energy in the predetermined frequency band. This vestibule may comprise an electromagnetic damping surface structure or reflective geometries to achieve attenuation.

In accordance with an aspect of the disclosure a system for multi-reading RFID tags carried by articles is disclosed. The system comprises a portal, a RFID reader, an entrance sensor, an exit sensor, and a controller. The portal has a reading zone disposed between an inlet and an outlet of the reading zone, the portal configured to receive a plurality of articles, each article including an RFID tag. The RFID reader may be configured to read the RFID tag of each article and transmit to a controller: (a) RFID code data that is based on the RFID tag, and (b) a read timestamp representative of the time that the RFID tag was read. The entrance sensor may be configured to detect a start trigger and transmit a start trigger timestamp to the controller, the start trigger timestamp indicative of the entrance into the reading zone of a first group of the plurality of articles. The exit sensor may be configured to detect a stop trigger and transmit a stop trigger timestamp to the controller, the stop trigger timestamp indicative of the exit of the first group from the reading zone. The controller is in operable communication with the RFID reader, the entrance sensor, the exit sensor, and an output interface. The controller may be configured to: receive the RFID code data and the read timestamp for each article; receive the start trigger timestamp and the stop trigger timestamp; determine a read area time range based on the start trigger timestamp and the stop trigger timestamp; determine an active read area timeframe based on the read area time range as adjusted by a pre-read offset and a post-read offset; associate RFID code data with the first group if the read timestamp associated with the RFID code data occurred during the active read area timeframe; and process the RFID code data of the first group and transmit a result of the processing of the first group to an output interface.

In accordance with an aspect of the disclosure a method for multi-reading RFID tags carried by articles is disclosed. The method may comprise receiving by a portal a plurality of articles, each article including an RFID tag; receiving, by a controller, RFID code data and an associated read timestamp for each article; receiving a start trigger timestamp and a stop trigger timestamp; determining a read area time range based on the start trigger timestamp and the stop trigger timestamp; determining an active read area timeframe based on the read area time range as adjusted by a pre-read offset and a post-read offset; associating RFID code data with a first group of the plurality of articles if the read timestamp associated with the RFID code data occurred during the active read area timeframe; processing the RFID code data with the first group; and transmitting a result of the processing of the first group to an output interface.

In accordance with an aspect of the disclosure a computer program product is disclosed. The computer program product comprises a computer usable medium having a computer readable program code embodied therein, the computer readable program code adapted to be executed to implement a method for multi-reading RFID tags carried by articles, the method comprising: receiving RFID code data and a read timestamp associated with the RFID code data for one or more articles received in a portal; receiving a start trigger timestamp and a stop trigger timestamp; determining a read area time range based on the start trigger timestamp and the stop trigger timestamp; determining an active read area timeframe based on the read area time range as adjusted by a pre-read offset and a post-read offset; associating the RFID code data with a first group of articles if the read timestamp occurred during the active read area timeframe; processing the RFID code data of the first group; and transmitting a result of the processing of the first group to an output interface.

BRIEF DESCRIPTION OF THE DRAWINGS

FIG. 3 is a plan view as in FIG. 1, but with a conveyor as the element that moves the groups through the read portal.

FIGS. 4 and 5 are perspective illustrations of the portal, FIG. 4 being partly in phantom to show internal structures.

DETAILED DESCRIPTION

As noted earlier, for portals of shorter length, achieving effective, high quality reading of RFID tags can be significantly reduced due to a variety reader functions including, but not limited to, reader power, trigger timing, antenna sensitivity, quantity of tags being in the reading zone and speed of movement through the reading zone. The reading zone is the portion of the physical portal where the RF power density incident on the RFID tags and the receiving antenna sensitivity are sufficient to discern the RFID tags information in a known multi-read tag polling/response process. Even at a moderate walking pace RFID tags may well be 1-2 feet past the trigger point before the read operation is fully engaged for the reading zone. On shorter portals this may place the tag population too far into the portal for the entire population of a group of RFID tags to be read before an exit trigger is tripped that stops the read operation.

Figure 15:
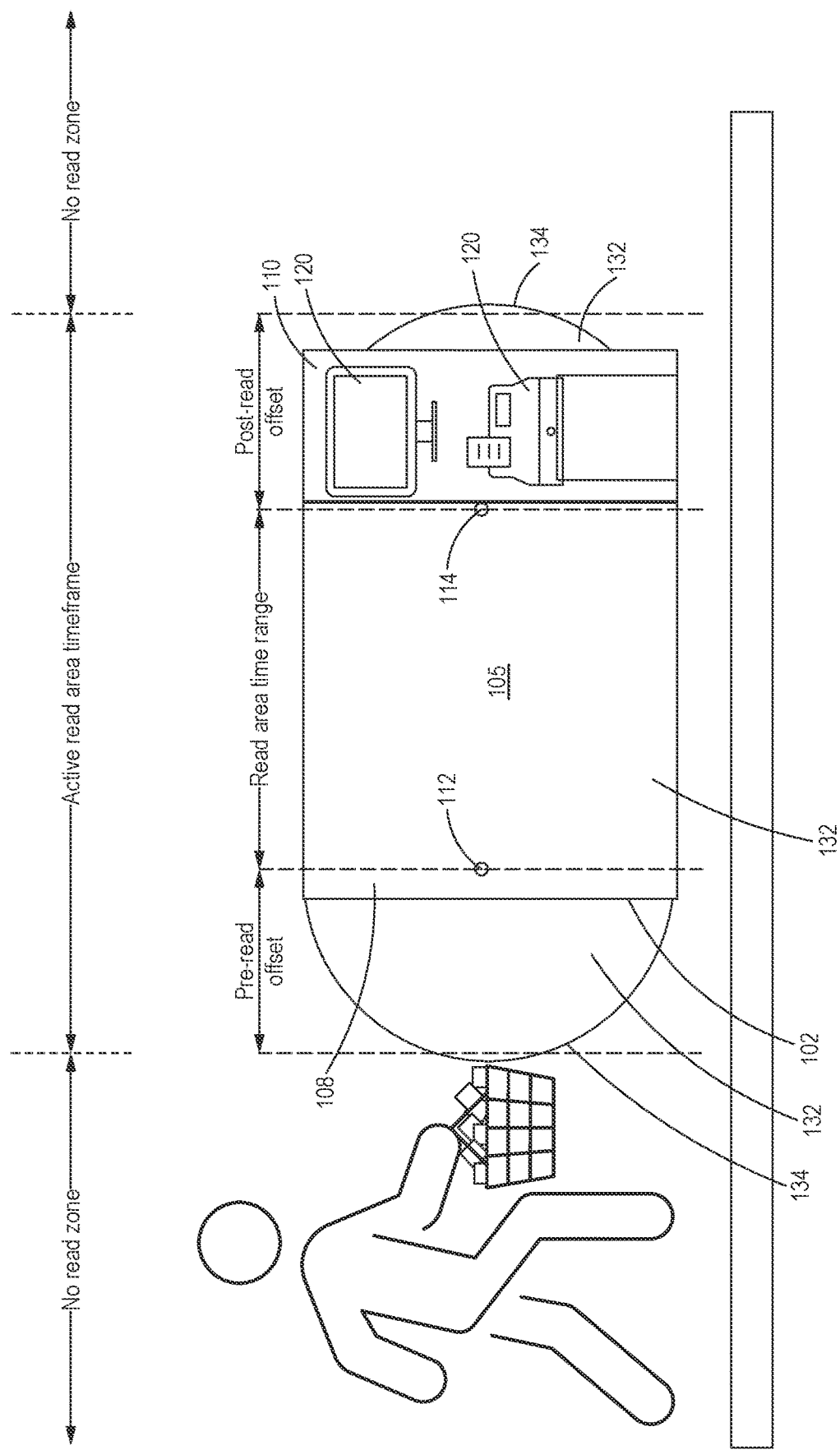
FIG. 15 is a schematic of the portal illustrating an exemplary read area time range, a pre-read offset, a post read offset and an active read area timeframe.

The system and method disclosed herein counteract this issue. As disclosed herein, the RFID reader is continuously available to read RFID tag information received from RFID antennas that continuously interrogate the RFID tags present in the area observable by the RFID antennas (the "RFID Observable Area"), and to capture the associated read timestamp whenever RFID tag information is read by the RFID reader during operation of the system. In one embodiment, during operation of the system, the RFID reader remains in an "Active State" in which the RFID reader causes continuous interrogation by the RFID antennas of the RFID tags present in the RFID Observable Area. The RFID Observable Area includes the reading zone and any areas outside of the reading zone in which the RFID antennas remain able to interrogate RFID tags and discern RFID tags information in a known multi-read tag polling/response process. Such areas outside the reading zone may include the (portal) entrance passageway (if any) leading to the reading zone and/or the exit passageway (if any) leading from the reading zone and/or a Bleed Area outside of the physical boundaries of the portal. "Bleeding" or "Bleed" is typically referred to as the interrogation and reading of RFID tags located outside of the physical boundaries of the portal. The "Bleed Area" (Reference 134 in FIG. 15) is the area outside of the portal in which Bleeding occurs. In the Active State, all interrogated RFID tags are read by the RFID reader, and a read timestamp is attached to each RFID tag read (as an example, the read timestamp is associated with the RFID code data of each RFID tag read). Further a virtual active read area that has virtual boundaries is utilized instead of or in addition to the traditional reading zone that is defined by physical boundaries.

A start timestamp (hereinafter referred to as "start trigger timestamp") is determined when the start of a group of RFID tags is detected at the entrance to the reading zone of the portal. The start trigger timestamp may be determined by the entrance sensor and provided to the controller. In one embodiment, the start trigger timestamp may be determined if a carrier of RFID tags, for example a cart or person, is detected at the entrance to the reading zone. Similarly, a stop timestamp is determined when the end of a group of RFID tags (hereinafter referred to as "stop trigger timestamp") is detected at the exit to the reading zone of the portal. The stop trigger timestamp may be determined by the exit sensor and provided to the controller. In an embodiment, the stop trigger timestamp may be determined if a carrier of RFID tags, for example a cart or person, is detected at the exit to the reading zone. The controller may determine the group of RFID tags based on the RFID tags that fall in the range of the start trigger timestamp and the stop trigger timestamp, as adjusted by the pre-read offset (if any) and/or the post-read offset (if any).

For example, serving as a start trigger point, an entrance sensor disposed at the entrance to the reading zone may detect the presence of an article entering the reading zone. A start trigger timestamp is associated with such detection. Alternatively, the entrance sensor may be used to detect the presence of a carrier of articles (e.g., shopping cart) as it enters the reading zone and the start trigger timestamp is associated with such detection. An exit sensor is configured to detect the presence of an article exiting the reading zone of the portal and a stop trigger timestamp is associated with such detection. Alternatively, the exit sensor may be used to detect the presence of a carrier of articles (e.g., shopping cart) as it exits the reading zone and the stop trigger timestamp is associated with such detection.

Because the RFID reader is continuously in an Active State and tags are interrogated and read, at a minimum, as soon as they pass into the RFID Observable Area, a much higher read rate is achieved due to a longer time in optimal read areas. By filtering the RFID reader output to include only the RFID tags that occur between the start trigger timestamp and the stop trigger timestamp, as adjusted by the pre-read offset (if any) and/or post-read offset (if any), the differentiation between groups of RFID tags is achieved.

It is advantageous to manipulate the perceived length of the portal by adjusting the start trigger timestamp with a pre-read offset and/or adjusting the stop trigger timestamp with a post-read offset. For example, subtracting 500 milliseconds (ms) from the start trigger timestamp has the effect of going back in time 500 ms before the start of the group of RFID tags was physically detected, thereby virtually increasing the length of the reading zone of the portal; likewise adding time to the stop trigger timestamp also has the effect of virtually increasing the length of the reading zone of the portal. In an embodiment, the length may be determined by the average speed of the RFID tags through the portal divided by the chosen offset, and this length may be chosen to coincide with the area before the start trigger point in which there is Bleeding, which may effectively extend the read zone beyond the physical portal. For example, this time dilation may add about 0.5 meters of virtual length to the portal for every 500 ms of offset (assuming a normal 1 m/s walking pace of a shopper pushing a cart or carry a basket or the like having therein items with RFID tags), allowing a physically compact portal to retain the ability to have read results that are consistent with a portal of longer length.

While this lengthening effect of the offsets may result in the reading of RFID tags beyond the physical portal boundaries (typically referred to herein as Bleeding), reasonable tradeoffs of unwanted Bleeding and fast response are achievable. The pre-read offset and post-read offset may be based on environmental factors such as: how much acceptable RF Bleeding is desired outside of the portal (without getting false readings of nearby RFID tags not in the group (e.g., not in the shopper's basket), and the estimated average speed and movement of a shopper walking through the portal. In one embodiment, the amount of desired Bleed (and the associated Bleed Area) may be the same or substantially equivalent to the (time) offset, which may aid in maximizing accurate results. In practice, RFID tags may tend to be read at varying distances due to physical limitation of the RFID tags, antenna geometry, RFID tag orientation, and a multitude of other factors, and the desired Bleed may be empirically determined based on these factors.

Depending on the environment in which the portal is disposed, determining and setting the pre-read offset and post-read offset to yield an active read area that is larger than the longest reasonably likely length/area at which a tag that is physically outside of the reading zone will be read is one way to ensure that all RFID tags in a given group are read and associated with the group. It is possible that this may, however, in some scenarios incur other problems. As the longer the active read area becomes, it may cause inadvertent reads of RFID tags that are in later groups and are not part of the RFID tags under observation. Setting the RFID reader to continuously re-read RFID tags and then filtering out duplicates may be utilized to ensure that if an RFID tag is read before the start trigger timestamp as adjusted by the pre-read offset, the RFID tag will still be re-read during the active period. In addition, physically limiting Bleed with portal composition and structure may also be utilized.

In some embodiment, memory (data) buffers may be used to increase the processing speed of the identification of groups of RFID tags. To eliminate large amounts of RFID code data and associated read timestamps from being buffered, in some embodiments, RFID code data and associated read timestamps for a group may be removed from the buffer after each group is identified and processed, or after one or more read cycles. The removal should retain the RFID code data of RFID tags that have read timestamps less than (earlier than) the time value that is equivalent to the start trigger timestamp less the pre-read offset so that RFID code data is not lost if a start trigger timestamp occurs immediately after a buffer filtering/removal of data. A periodic removal of RFID code data in the buffer (preferably during idle times) may be utilized as a corrective action to eliminate code data from RFID tags that were within the RFID Observable Area but for which no start trigger timestamp was received—thus causing a build-up of RFID code data and associated read timestamps in the buffer.

In some embodiments, distance sensors may be used to monitor the position of the RFID tag population, e.g., looking at either the physical carrier of the group of RFID tags, the motive object moving the RFID tags, or a combination of the two, actual RFID tag positioning within the portal may be estimated and the result used to enable better antenna ordering during multiplexing, as is known in the art.

This additional positional information of the RFID tag population may be combined with the data from the start trigger timestamp and stop trigger timestamp to confirm identification of the RFID tags that have passed through the portal versus those that are outside of the portal, resulting in increased accuracy in environments that include stray RFID tags.

The portal includes a pair of opposing side walls. Some embodiments may also include a top and a base. The disclosed portal is configured and operated to contain a sufficiently high level of RF power to efficiently and accurately read numerous UHF RFID tags (e.g., hundreds) that are densely disposed within the confines of the structure, e.g. an open-ended (portal) structure. The portal structure is electromagnetically shielded and can be sufficiently sized to allow passage of a person either carrying containers or pushing carts laden with tagged goods.

Embodiments of the portal are shown in FIGS. 1-16. The embodiments shown in 1-2, 4-5, 8-12 and 13-15 are dimensioned to accommodate the required RFID tagged articles in a container in addition to a person moving them through the portal. In alternative embodiments, such as shown in FIG. 3, the portal can be smaller, accommodating bins or bags or the like placed on a conveyor. In these embodiments, the portal is generally shaped as a tunnel defined by an inverted channel. In some embodiments, the portal may optionally include a base element. In further embodiments, the container for the items may be sized to resemble a shopping cart in which the RFID tagged items are placed, and the portal is sized to allow the cart to passed through the channel defined by the upright side walls of the portal.

In the embodiments shown in the drawings, the RFID tagged articles may be densely arranged in a rolling cart or carried in a bag, and may be movable at a faster or slower transit speed and/or may be caused to remain in the reading zone of the portal for a longer or slower residence time.

In the depicted embodiments, the side walls, and optionally top (not shown) and bottom (not shown) of the portal structure, and at least part of the entry and exit vestibule passages may incorporate a Salisbury Screen type absorptive area. Other RF absorbing materials that are active in the proper frequency range can be provided in lieu of the Salisbury Screen or in addition thereto, to absorb direct and reflected RF waves from exiting the portal footprint. A suitable lossy carbon-loaded flexible foam sheet stock is the Cuming Microwave product "C-RAM MT," which is considered to provide a broad frequency range of dielectric loss. (See http://stores.cumingmicrowave-online-store.com/11-c-ram-mt-30-5-x-24-x-24-/.)

As described above, the Salisbury configuration can include a facing conductive layer on the inside surface of the vestibule wall, spaced by a frequency dependent distance from a conductive backplane. Suitable conductive film for the inside surface and the backplane is Safe Living Technologies Inc. product SLT-1053. (See http://www.slt.co/products/RFShieldingWindowFilm/RFWindowFilm-SignalProte-ct-Clear.aspx). This product is also optically clear, which is desirable to contribute to the open feeling of the disclosed embodiment.

The reading zone of the portal contains surrounding RFID antennas to read the tagged articles from multiple directions using both direct and reflected waves. This section maintains the high RF power density required to power on the passive UHF RFID tags. Examples of antenna placement, including niche mounting and operation in complementary sets, are disclosed for example, in U.S. Pat. No. 9,760,826, which has been incorporated by reference. The arrangement shown has a clamshell structure of conductive material (trapezoidal in cross section) in which five antenna segments are mounted (ten including both sides of the reading zone) to as to be directed inwardly toward the reading zone. Although not shown specifically, the clamshell shape can be parabolic for focusing signal strength. The clamshell structure can also include additional structures for directing electromagnetic energy to and from the antennas, such as Fresnel parabolic segments, meta-material waveguides or the like.

In some embodiments, walls 2 of the entrance vestibule of the portal leading into the reading zone may be electromagnetically absorptive. For example, the inside of the entrance vestibule walls 2 may be lined with a Salisbury bandstop attenuating structure and/or the walls comprise a broadband absorptive layer such as a carbon loaded foam or graphite-loaded rubber or plastic sheet material for resistive loss, or alternatively a ferrite loaded polymer. A conductive film sheet is can be applied on the outsides of the walls 2, as a ground plane or outer barrier against propagation, as explained further below. Walls 2 include at least inwardly reflective walls 3 at the central reading zone. The reflective walls 3 confine and magnify RF energy coverage the inside reading zone, as generated as well as received by antennas 4 that are provided around the reading zone (e.g., in niches in the sidewalls and optionally the top and/or bottom). The primary coverage area for the antennas is area 5, in and around the reading zone of the portal.

Figure 1:
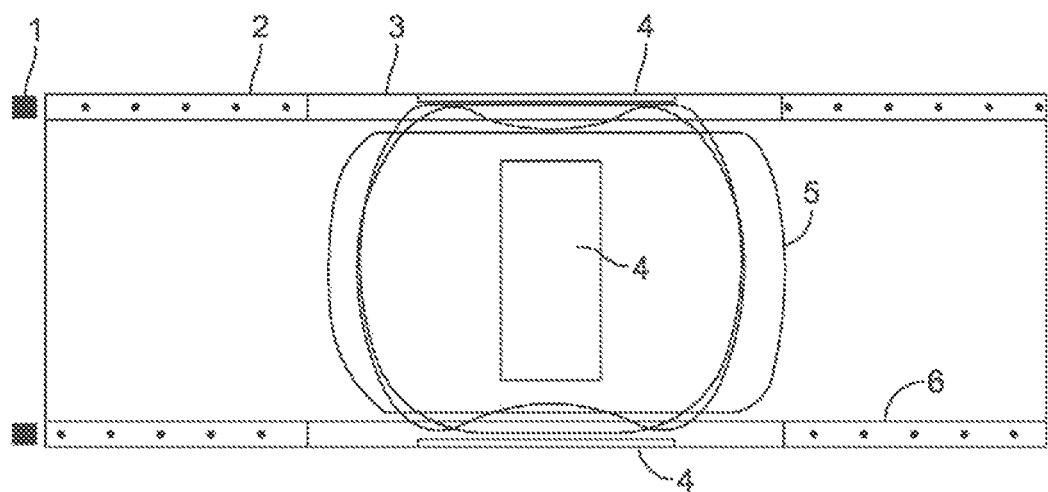
FIG. 1 is a plan view showing a portal according to the invention, including the locations of the antenna reading zone and electromagnetic damping surfaces. The transit path is horizontal.
Figure 2:
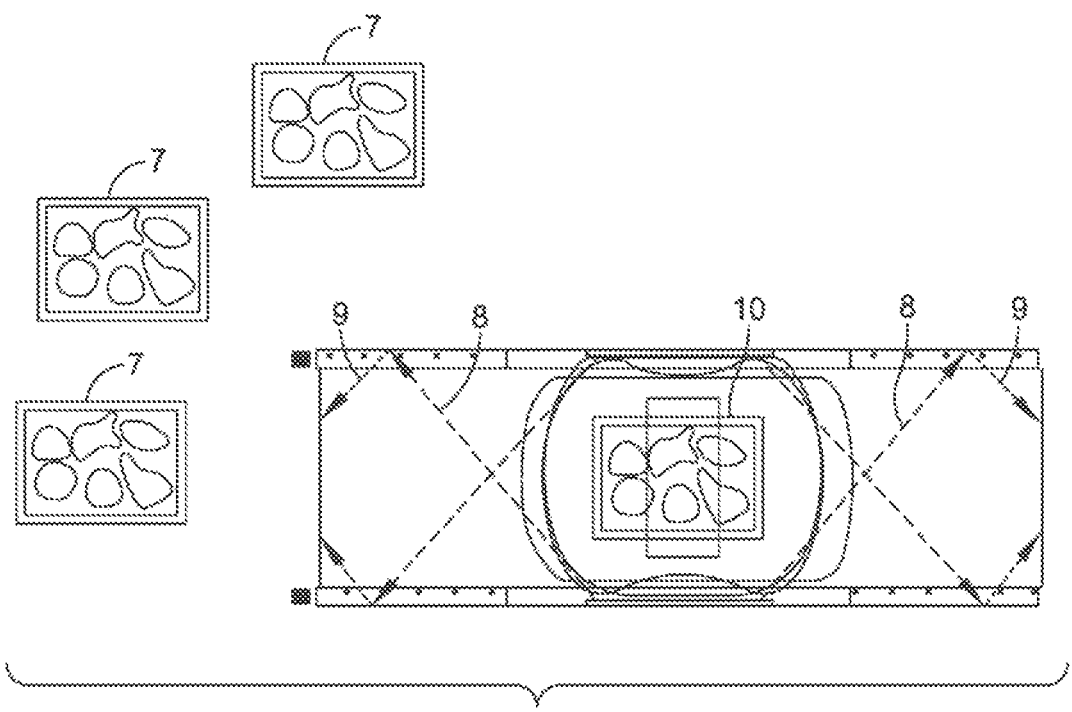
FIG. 2 is a schematic illustration as in FIG. 1, with groups of tagged articles queued for reading and one group having been manually moved into in the reading zone.
Figure 6:
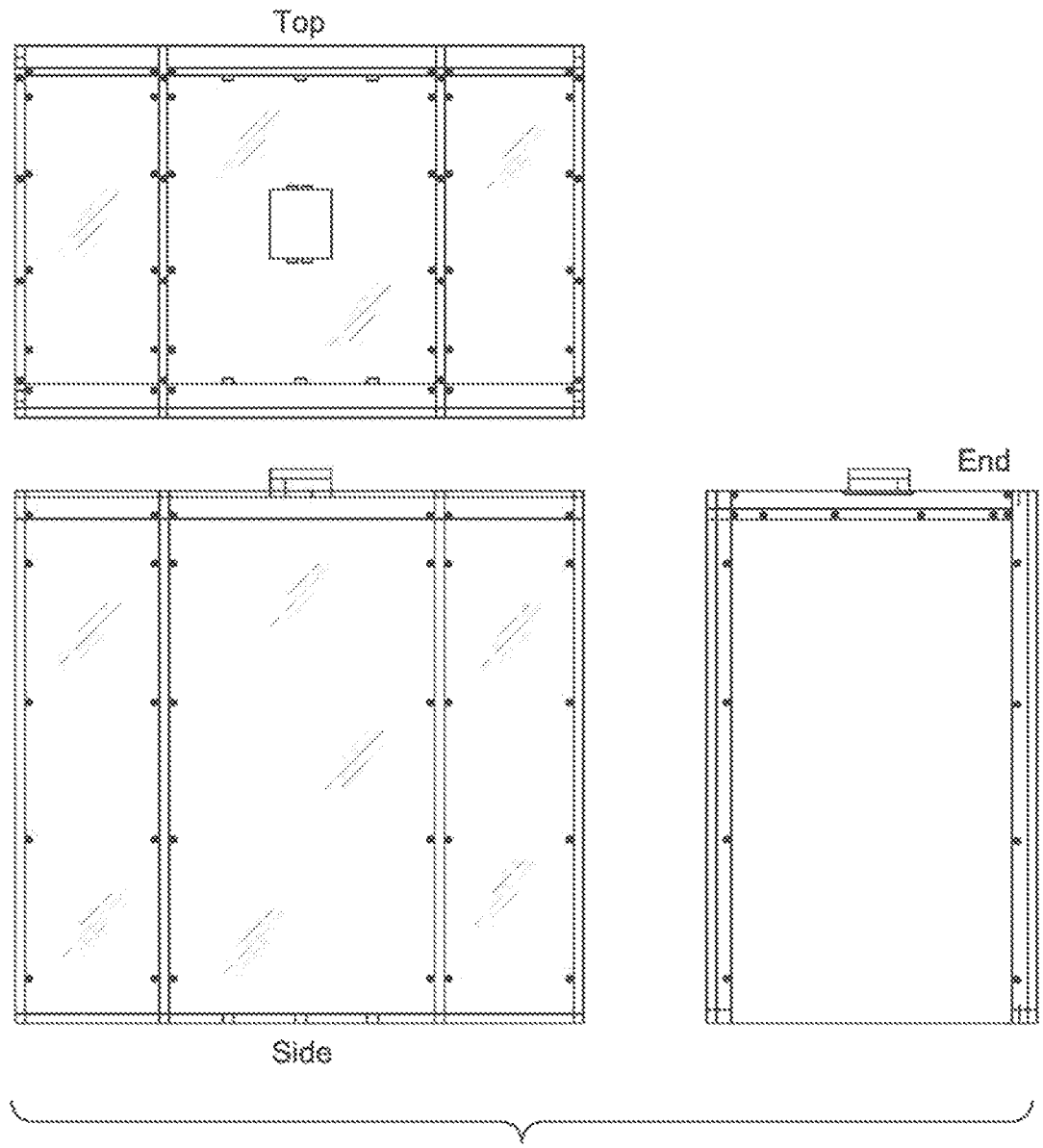
FIG. 6 is a set of plan and elevation views showing specific dimensions of an embodiment sized for manually pushing carts through the reading zone.

Proceeding through the portal, absorptive areas 6 are also provided at the exit end. Tagged items that are outside the portal such as carts, are not only shielded by the portal walls, but as best seen in FIG. 2, insofar as the carts are along a propagation path from the inside of the portal, most of the incident RF energy shown along dotted lines 8 is reflected between the portal walls, encountering the Salisbury damping material and emerging as attenuated energy 9, such that the antennas have limited if any interaction with the items in the external carts 7, at least very substantially less than the interaction of the antennas with the cart 10 that is being read actively.

Figure 7:
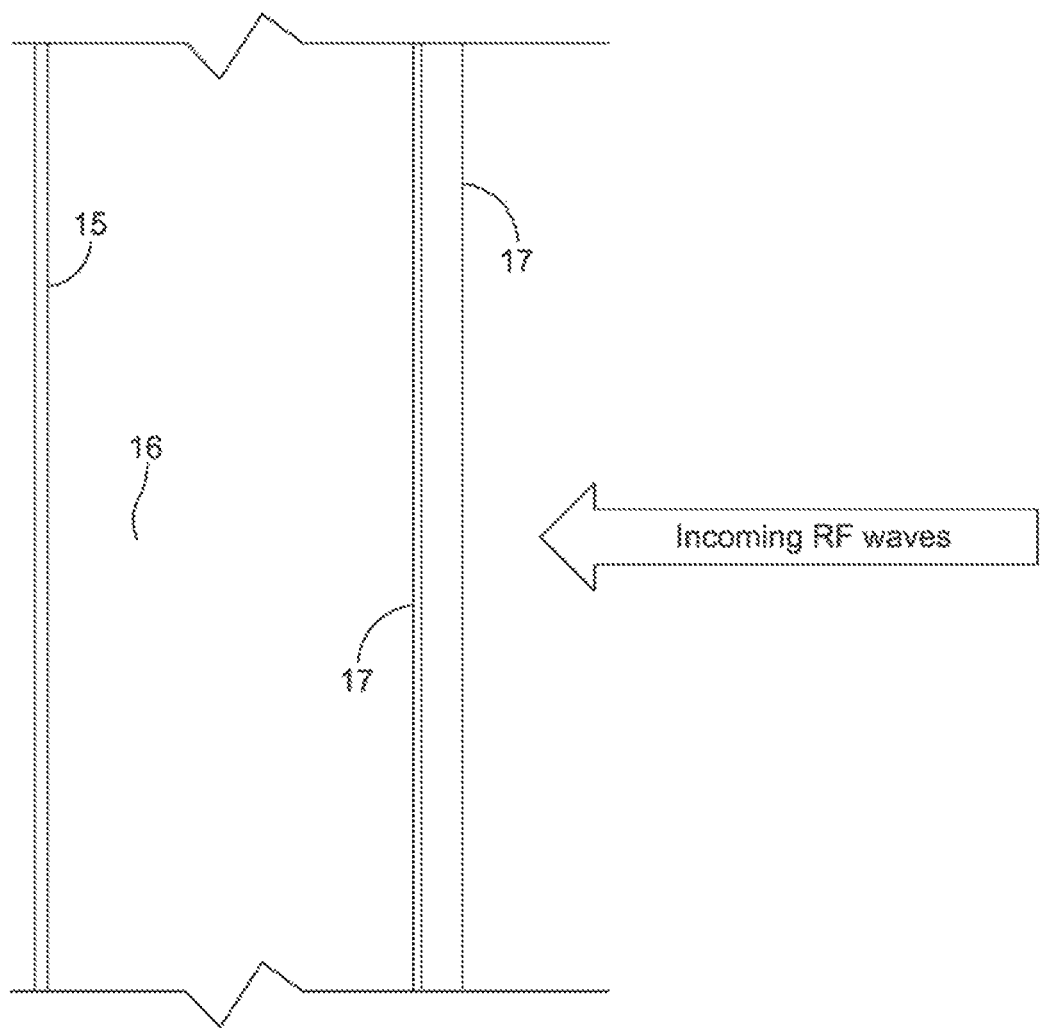
FIG. 7 is a schematic illustration showing a direction if propagation of RF waves.

In FIG. 7, the electromagnetically reflective surface needed as the ground plane of the Salisbury screen may be provided by the metal skin of the portal structure. In FIGS. 4 and 5, area 12 can be absorptive. Area 13 is reflective (see also the reflective floor 14, which may include one or more bottom-mounted antennas). Area 15 is a metallic reflective wall forming the back side of the Salisbury screen and the outside skin of the portal.

An air space 16 (FIG. 7) is preferably dimensioned to correspond to the (λ/4) spacing for the Salisbury screen where λ is the wavelength of the center frequency used. As a nonlimiting example configured for RFID multi-reading in the US, a 3.226 inch space 16 corresponds to a quarter wave length with a center frequency of 915 MHz, the nominal US operational frequency. A lossy dielectric 17 with approximately 377Ω surface resistance matches the free air impedance. A low loss dielectric plastic 18 structurally supports and prevents damage to the thin lossy layer 17. The direction of the RF waves is shown in FIG. 7.

The foregoing dimensions can be varied according to the particular RFID operational frequency or frequencies used to charge the tags and to receive responses from the tags. Presently, worldwide UHF operational frequencies are typically from about 860 to 960 MHz. Likewise, it is within the scope of the invention to enable two or more different operational frequencies to be accommodated, preferably with sections of the vestibule passageway between the reading zone and the area outside the reading zone arranged to include portions configured to attenuate the two or more different frequencies.

Figure 8:
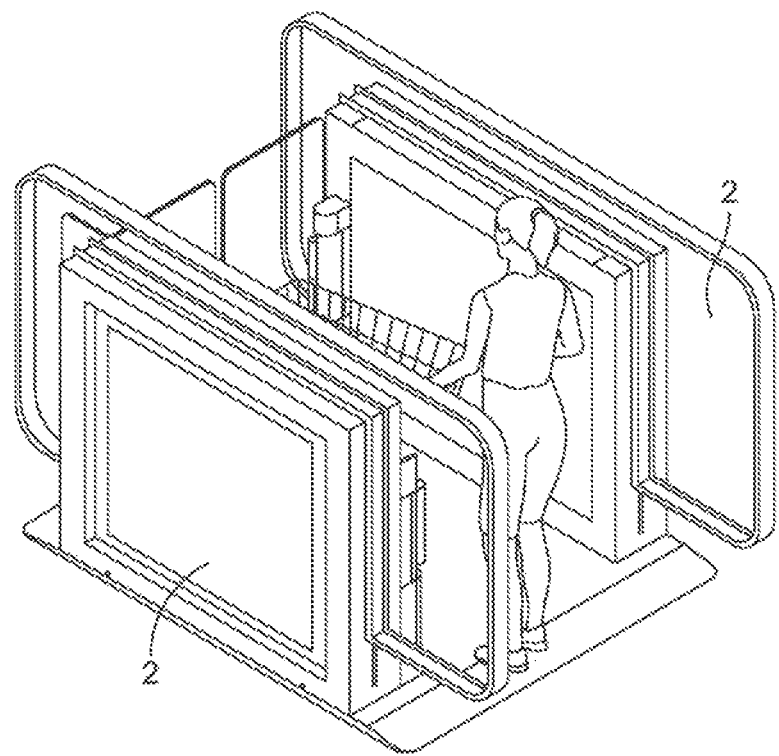
FIG. 8 is a perspective drawing showing the application of the invention to multi-read scanning of articles in a shopping cart pushed by a person into a delineated reading zone, as might be typical of an automated or semi-automated retail checkout line.
Figure 9:
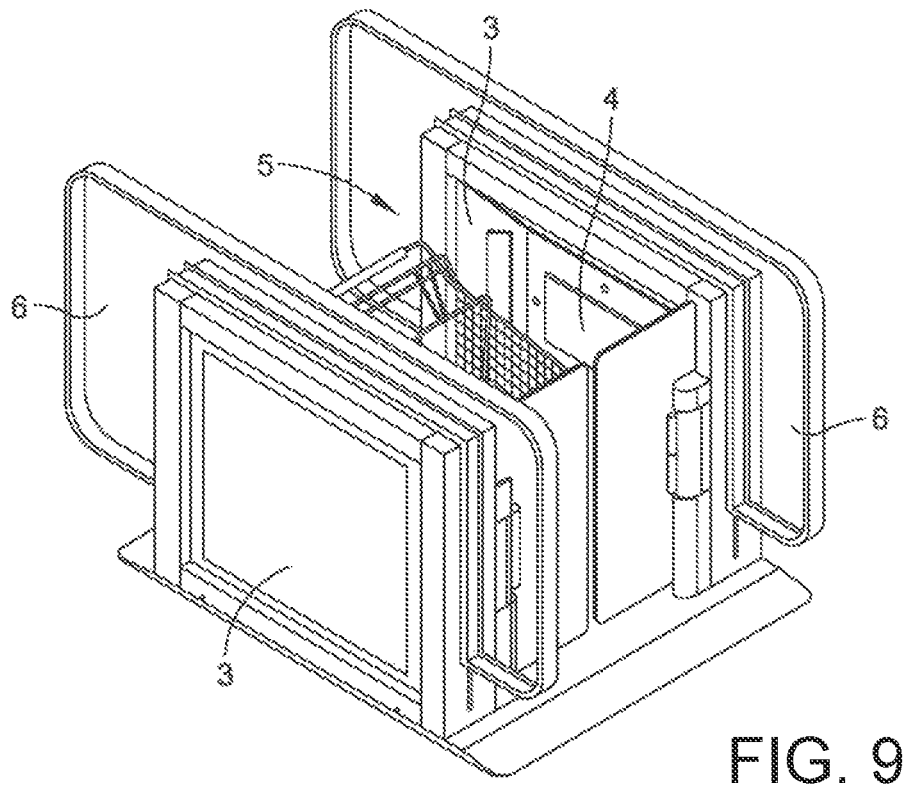
FIG. 9 is a perspective drawing substantially from an opposite side of the reading zone and including illustration of an end door.
Figure 10:
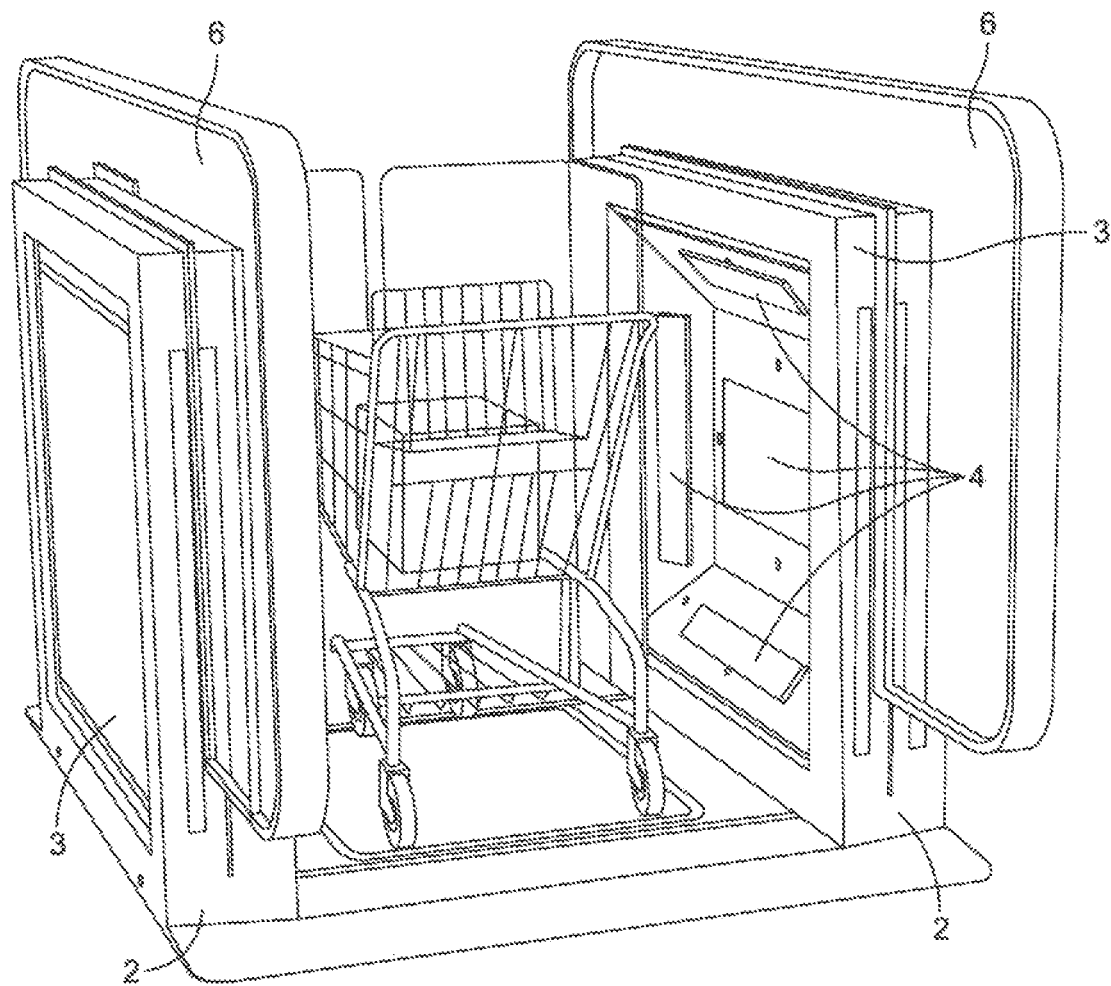
FIG. 10 is a perspective illustration corresponding generally to FIGS. 8 and 9 and showing additional details.

FIGS. 8-10 show an exemplary embodiment of the portal for multi-read scanning of articles in a shopping cart pushed by a person into a delineated reading zone, as might be typical of an automated or semi-automated retail checkout line. Among other aspects, the configuration of the portal concentrates the electromagnetic signals that are sent and received to the zone 5, where RFID tagged articles are situated, and minimizes potential communication with RFID tagged articles that are outside of the zone 5, especially miscellaneous items of stock (not shown) that are shelved nearby in a retail store or being carried or carted about by other customers.

The embodiment in FIGS. 8-10 can contain a Salisbury RF attenuation structure on the inner facing sides of vestibule walls 2 or the walls 2 themselves can be structured as Salisbury stopgap attenuators. In that embodiment, the inner sides are faced with a conductive sheet spaced from a conductive backplane by an air gap or other dielectric space configured to attenuate the operational RFID charging and reading frequencies used. Alternatively, the bodies of vestibule walls 2 can comprise a loading of particulate carbon, graphite, ferrite or the like, rendering the walls 2 lossy. Preferably, a conductive sheet is applied to the outsides of lossy vestibule walls, for redirecting electromagnetic energy back inwardly by reflection.

A passage for the cart and the associated person is defined as an elongated vestibule between walls 2 leading into and beyond the central reading zone 5. The walls 2 have clamshell shaped conductive wall portions 3 that exploit electromagnetic reflection in and immediately adjacent to the reading zone, so as to concentrate electromagnetic interaction there as discussed above. Likewise, one or preferably several absorptive structures are provided along areas 6, disposed outwardly from the reading zone 5, so as to damp propagating reflections at one or more operative RFID scanning frequencies. The absorptive structures can extend along two opposite sidewalls 2 of the vestibule up to a height somewhat above the highest point at which scannable items can be situated in the cart. According to different possible embodiments, the reflective portions for concentrating signal amplitude in the reading zone and the damping portions for reducing the amplitude of signals propagating by reflection, can be placed on one or two opposite sides of the passage, optionally above and below the passage, and optionally across the entry and exit paths via movable doors or through circuitous pathway layouts that preclude line-of-sight signal pathways.

The reflective portions of walls 2 are placed strategically to concentrate signal strength at the reading zone 5, subject to the antennas 4. The damping portions are placed so as to reduce signal propagation (both transmit and receive) outside of the reading zone 5. These placements are selected in part to confine propagation of signal strength at the reading zone and in part to damp lines of signal propagation that lead to RFID tagged stock outside of the reading zone. An enclosure having one to six sides electromagnetically damping surfaces enclosing the pathway between vestibule walls 2 provide these effects, and are useful if arranged to complement external attributes of the premises such as structures and distances between the passage and the outside RFID tagged stock. In the illustrated embodiment, the walls 2 are primarily along opposite lateral sides and to a height somewhat above the articles to be scanned in the reading zone.

The respective side wall or walls (and optionally also top, bottom and ends) can be arranged to serve additional functions. For example, the bottom of the passage can be configured as the pan of a weigh scale, whereby the measured weight of the cart may be compared to the expected weight as a result of RFID code scanning results, after summing the expected weights based on stored weight data cross referenced to RFID codes. The walls may carry optical data input devices such as still or video cameras, or laser UPC barcode scanners to supplement data input by comparison of barcode values to detected RFID tag codes. As another example, the side wall(s) may be used to present promotional messages, to announce offers or the application of discounts, to offer free items to a customer, etc.

FIG. 9 is a perspective drawing substantially from an opposite side of the reading zone and including illustration of an optional end door. The end door likewise can serve signal reflective confinement or reflection damping functions as well. In certain embodiments, the end door is controllable so as to be closed during a reading operation and opened when the reading operation has been successfully completed, thereby signaling the person to continue on through the pathway to an exit.

Figure 12:
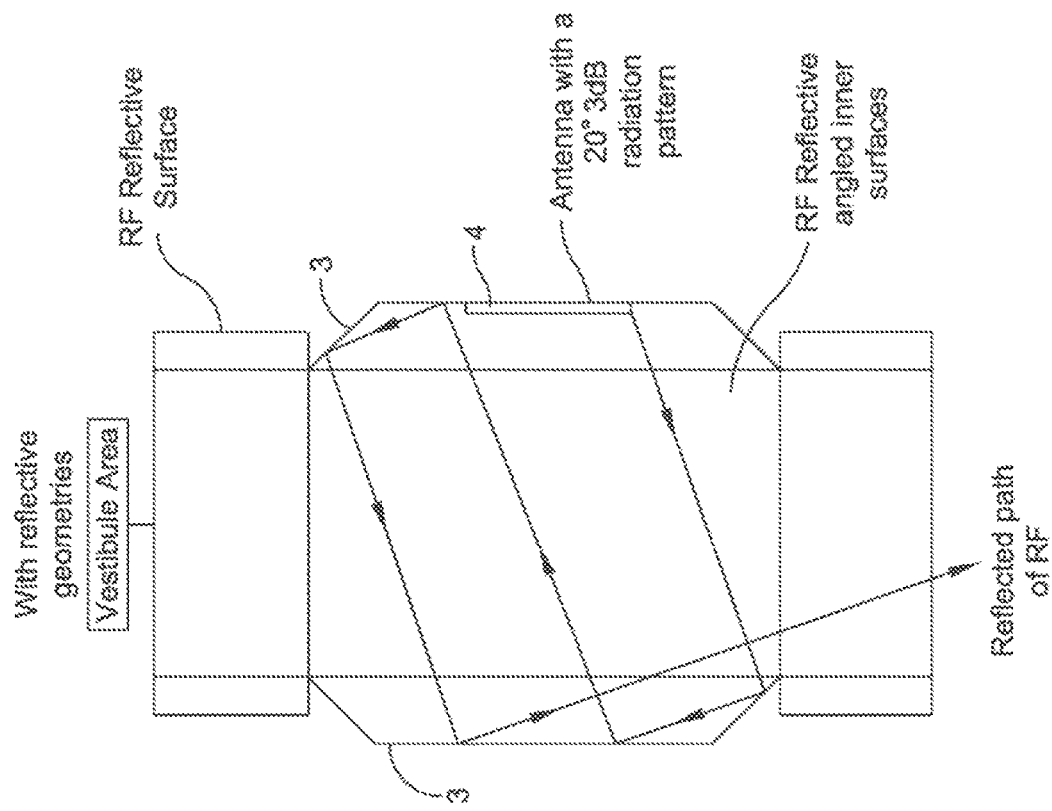
FIGS. 11 and 12 are schematic plan views showing certain signal propagation paths.
Figure 11:
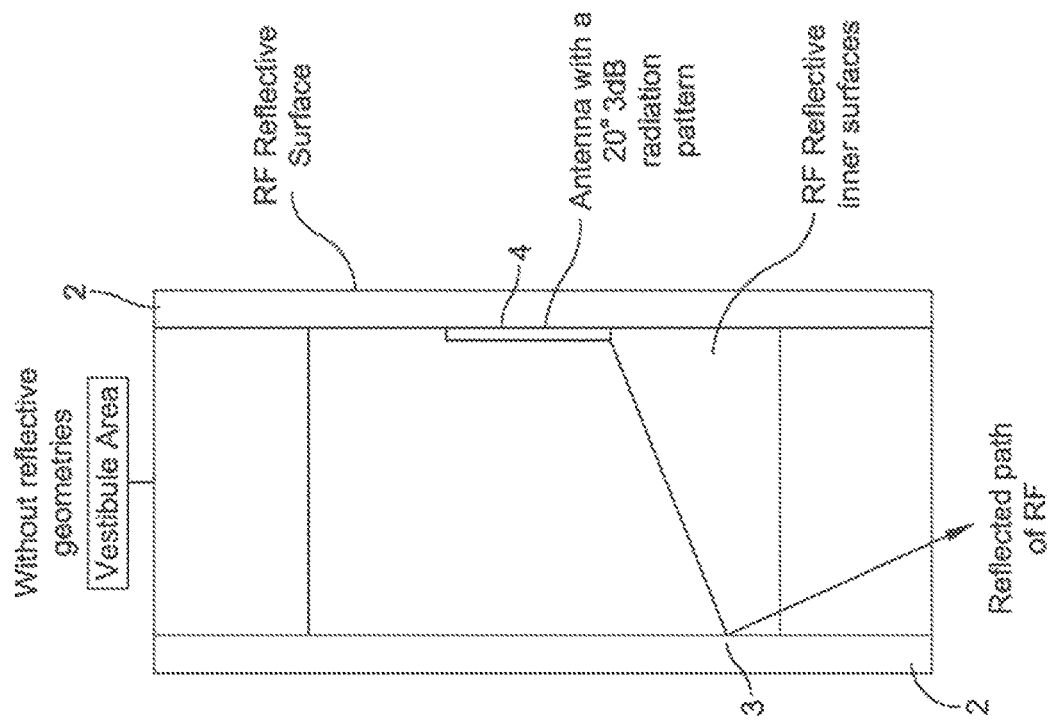
Figure 13:
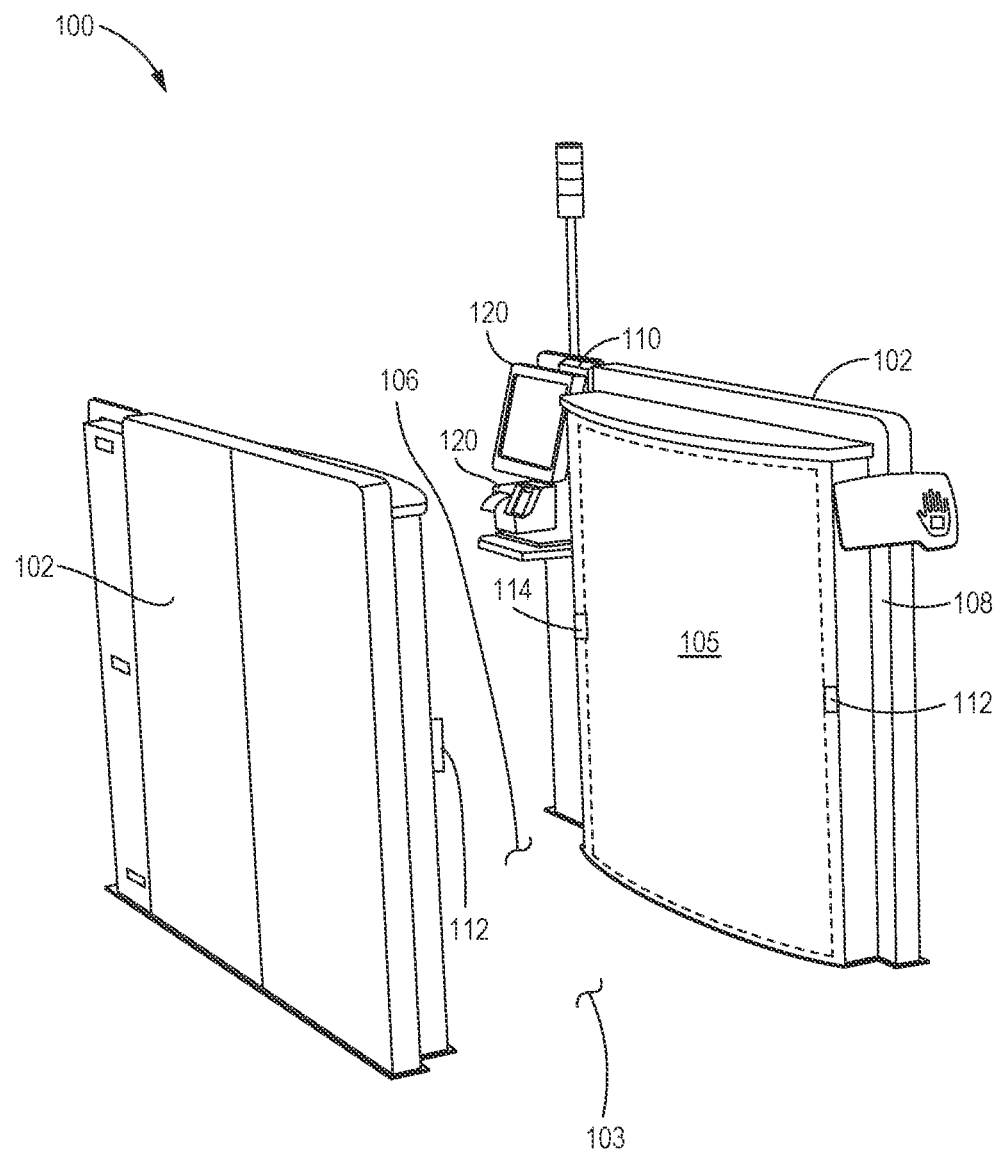
FIGS. 13-14 are perspective views showing a portal according to the disclosure.
Figure 14:
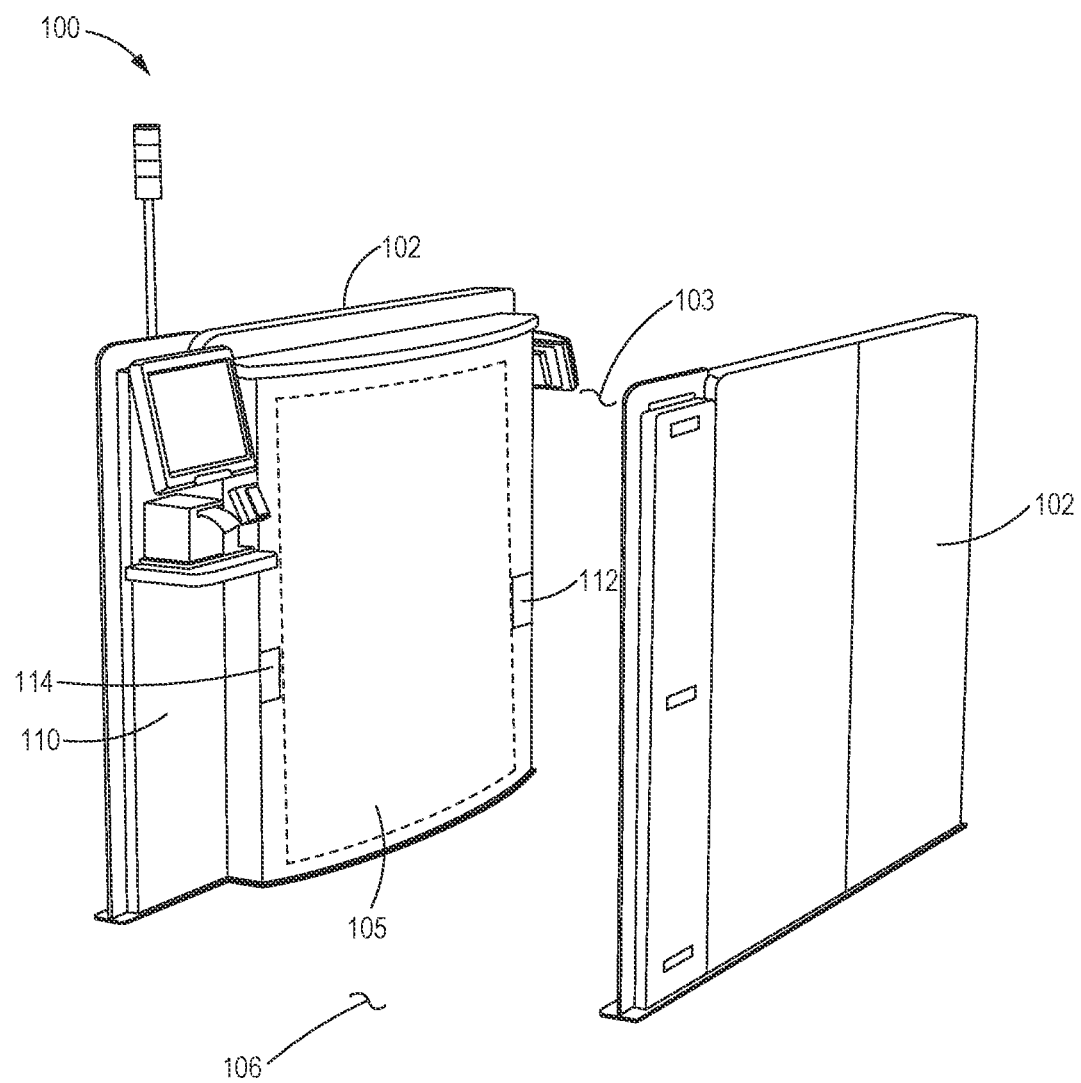

FIG. 10 is a perspective illustration corresponding generally to FIGS. 8 and 9 and showing additional details. FIGS. 11 and 12 are comparative plan views, FIG. 12 including the clamshell reflective structure around an antenna (only one being shown). The clamshell reflective structure not only focuses signal strength on the reading zone but also elongates the propagation path of signals that are reflected transversely and finally obliquely across the reading zone. In this case the antenna has an exemplary power distribution of 3 dB down at 20° off the center line, whereby direct line propagation at a signal strength above half power (−3 dB) substantially impinge on the inner walls of the vestibule and can be damped by Salisbury or other lossy means as discussed above.

FIGS. 13-16 illustrate another embodiment of a portal. The portal 100 structure includes a pair of opposing side walls 102 and a reading zone 105. The reading zone 105 has an inlet 103 (entrance) and an outlet 106 (exit). As in the other embodiments discussed herein, the reading zone 105 is the portion of the physical portal 100 where the RF power density incident on the RFID tags and the receiving antenna 104 sensitivity are sufficient to discern the RFID tags information in a known multi-read tag polling/response process.

The portal 100 disclosed in FIGS. 13-16 is similar to those previously discussed herein except that it is of a shorter overall length. The side walls 102 may define an entrance passageway 108 disposed immediately before the reading zone 105. In the embodiment of FIGS. 13-16 the entrance passageway 108 may be shorter in length than that of prior discussed embodiments of the portal. The side walls 102 may also define an exit passageway 110 disposed immediately after the reading zone 105. In the embodiment shown in FIGS. 13-16 the exit passageway 110 may be shorter in length than that shown in prior embodiments.

Figure 16:
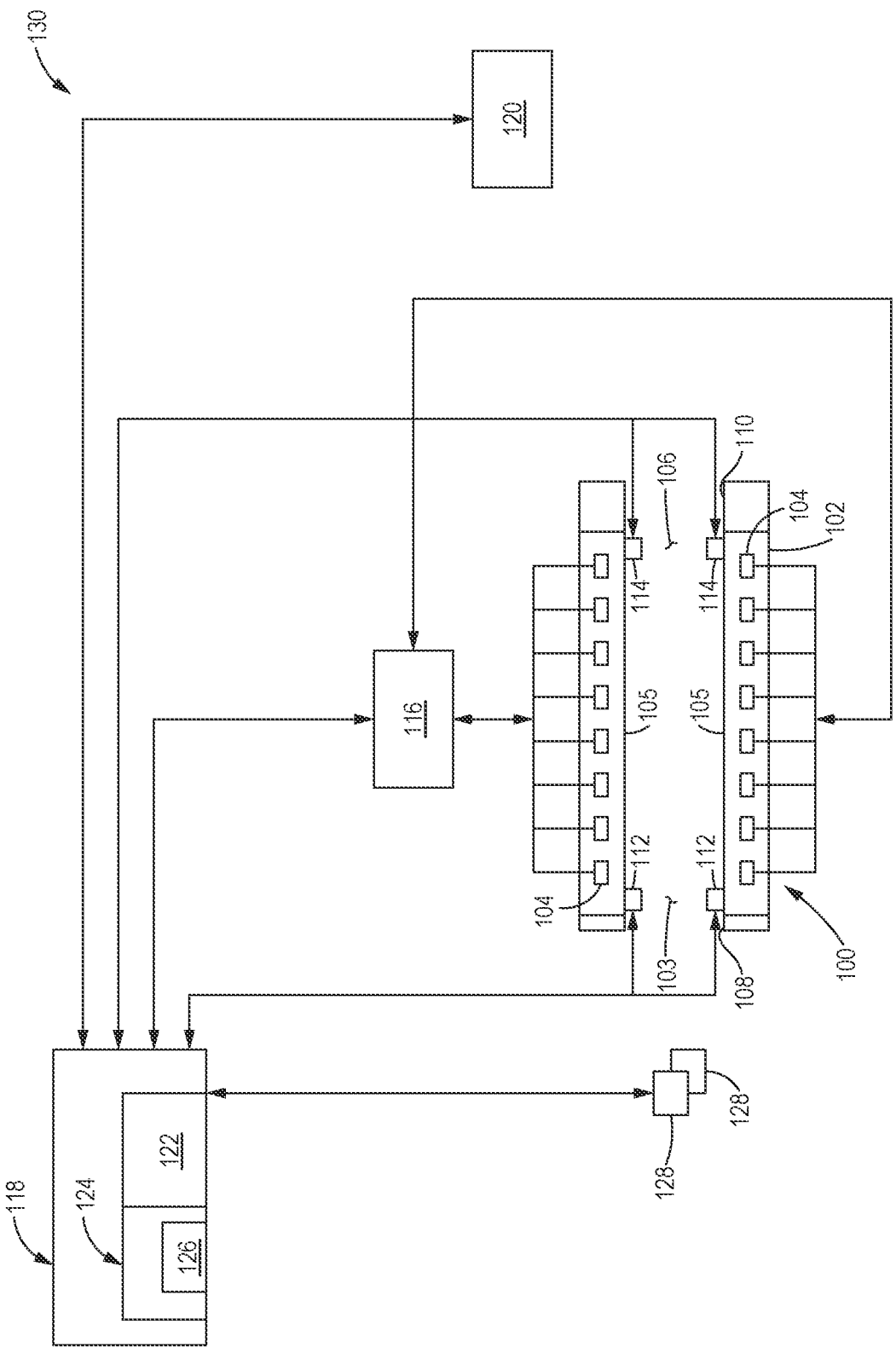
FIG. 16 is a schematic illustration of a system incorporating the portal.

Referring now to FIG. 16, therein is illustrated a system 130 for reading RFID tags that incorporates the portals discussed herein. The system 130 includes the portal 100, an entrance sensor 112, an exit sensor 114, a RFID reader 116, one or more RFID antennas 104 in operable communication with the RFID reader 116, and a controller 118. The system 130 may further include an output interface 120. In some embodiments, the system 130 may also include one or more distance sensors 128.

The entrance sensor 112 is configured to detect a start trigger for a group of articles. The start trigger may be the presence of a carrier (e.g., a cart or the like), which contains the RFID tagged articles, that is disposed in the inlet 103 (entrance) of the reading zone 105, or the start trigger may be the presence of the first article (in a group) that is disposed in the inlet 103 (entrance) of the reading zone 105. The entrance sensor 112 is in operable communication with the controller 118 and is configured to transmit or provide to the controller 118 the start trigger timestamp, which is the timestamp associated with detection of the start trigger by the entrance sensor 112. In some embodiments, the entrance sensor 112 may be further configured to provide to the controller 118 data associated with the carrier or article detected.

The exit sensor 114 is configured to detect a stop trigger for a group of articles. The stop trigger may be the presence of a carrier (e.g., a cart or the like), which contains the RFID tagged articles, that is disposed at the outlet 106 (exit) of the reading zone 105, or the stop trigger may be the presence of the last article (of a group) that is disposed in the outlet 106 (exit) of the reading zone 105. The exit sensor 114 is in operable communication with the controller 118 and is configured to transmit or provide to the controller 118 the stop trigger timestamp, which is the timestamp associated with the detection of the stop trigger by the exit sensor 114.

In one embodiment, the entrance sensor 112 may be one or more photocells disposed at the inlet 103 of the reading zone 105, and the exit sensor may be one or more photocells disposed at the outlet 106 of the reading zone 105. Other embodiments may utilizes a laser based sensor (break in a laser beam), a motion detector, or other visual sensors known in the art for the entrance sensor 112 and/or exit sensor 114.

One or more RFID antennas 104, each in operable communication with the RFID reader 116. In the embodiments shown, the RFID antennas 104 may be disposed on the side walls 2 of the portal 100. In exemplary embodiments, the radiated power from the RFID antennas 104 ensures sufficient power density to efficiently charge the multi-read RFID tags in the RFID Observable Area, which are otherwise passive devices. In embodiments in which there are conductive vestibule walls of the portal 100 that are adjacent to the reading zone 105 of the portal 100, such conductive walls concentrate direct and reflected RF energy for charging and responsive signal propagation. The RFID antenna design and placement choices on the portal 100 preferably serve to focus the signal power into the reading zone 105, e.g., focus the signal power into a reading zone window or volume through which the tagged items are constrained to pass. As discussed earlier herein, the reading zone 105 of the portal 100 contains surrounding RFID antennas 104 to read the RFID tagged articles from multiple directions using both direct and reflected waves. This section maintains the high RF power density required to power on the passive UHF RFID tags. Examples of RFID antenna 104 placement, including niche mounting and operation in complementary sets, are disclosed for example, in U.S. Pat. No. 9,760,826, which has been incorporated by reference.

In various embodiments, direct and reflected RF energy may be confined by RFID antenna 104 directionality, reflective surface geometry and/or electromagnetic shielding, as is reasonably feasible within the footprint of the portal 100 to limit the unintended reading of RFID tags that are outside of the group of tags under scrutiny. Among other aspects, confining the RF energy, placement of the read/response RFID antennas 104 into shielding niches that are indented into the portal 100 side walls 102, side walls 102 that may be at least partly defined by conductive materials, and RF damping or anti-reflective surfacing such as Salisbury quarter wave RF damping arrangements may be included.

RFID tag reads can be made quickly in a known polling manner, whereby hundreds of RFID tags are dependably read in the transit time through the RFID Observable Area, for example, in the time it takes a human person to transit the RFID Observable Area at a normal walking pace, carrying the RFID tagged articles in a bag, sling, container or cart or carried on or about the person. In alternate embodiments, the RFID tags may be moved through the RFID Observable Area on a conveyor. Each RFID antenna 104 is configured to transmit power to the RFID tags to activate and interrogate such tags. Each RFID antenna 104 is configured to receive RFID tag information from the RFID tags and to transmit such to the RFID reader 116. The RFID tag information may be in the form of radio waves.

The RFID reader 116 is in operable communication with the RFID antennas 104 and is configured to control the RFID antennas 104. As such, the RFID reader 116 is configured to initiate or cause the RFID antennas 104 to interrogate RFID tags, as is known in the art. The RFID reader 116 is further configured to receive from each RFID antenna 104 the RFID tag information and to "read" the RFID tag information and generate RFID code data based on the RFID tag information, as is known in the art. The RFID reader 116 is in operable communication with the controller 118. The RFID reader 116 is configured to transmit or provide to the controller 118 the RFID code data and a timestamp indicative of the time at which RFID tag information was read by the RFID reader 116 (hereinafter referred to as a "read timestamp") and RFID code data was generated based on that RFID tag information.

The distance sensor 128 is configured to detect and monitor the position of the RFID tags by monitoring the carrier (e.g., a person, cart or the like) of the RFID tagged articles or the motive object moving the RFID tagged articles. In an embodiment that utilizes one or more distance sensors 128, such distance sensors 128 may be optical sensors, radar sensors, point sensors, or any other sensor known in the art to detect ingress or egress into/out or through a portal 100 of a carrier. The distance sensor 128 is configured to provide to the controller 118 information associated with the position of the carrier.

The controller 118 is in operable communication with the entrance sensor 112, the exit sensor 114, the RFID reader 116 and with one or more output interfaces 120. In embodiments which include distance sensors 128, the controller is in operable communication with the one or more distance sensors 128. The controller 118 may include a processor 122 and a memory component 124 that includes a buffer 126. The controller 118 is configured to receive RFID code data from the RFID reader 116 and a read timestamp. In an embodiment, the controller 118 may place the RFID code data and associated read timestamp into memory 124. In some embodiments, the memory 124 that the controller 118 may place the RFID code data and associated read timestamp into may be a (data) buffer 126 or the like. The controller 118 is further configured to receive a start trigger timestamp from the entrance sensor 108 and a stop trigger timestamp from the exit sensor 110.

The processor 122 may be a microcontroller, a digital signal processor (DSP), an electronic control module (ECM), an electronic control unit (ECU), a microprocessor or any other suitable processor 122 as known in the art.

The processor 122 may be configured to determine a read area time range, the read area time range from the start trigger timestamp to the stop trigger timestamp; and to determine an active read area timeframe based on the read area time range as adjusted by a pre-read offset and a post-read offset.

The processor 122 may execute instructions and generate control signals for determining a read area time range. The read area time range is the time period from the start trigger timestamp to the stop trigger timestamp, inclusive of the endpoints. In other words, the starting point of the read area time range is the start trigger timestamp and the ending point of the read area time range is the stop trigger timestamp. For example if the start trigger timestamp is 10:00:00.000 (hh:mm:ss.000) and the stop trigger timestamp is 10:00:01.000 (one second later), the read area time range is 10:00:00.000 to 10:00:01.000. The read area time range represents the time period in which articles in the group were present in the reading zone 105 of the portal 100.

The processor 122 may retrieve from memory 124 the pre-read offset and the post-read offset. The pre-read offset is the amount of time (for example, 500 milliseconds) by which the start point of the read area time range is adjusted. When the pre-read offset is a positive number the adjustment has the effect of lengthening the range for which RFID code data are grouped. When the pre-read offset is a negative number the adjustment has the effect of shortening the range for in which RFID code data will be grouped. The post-read offset is the amount of time (for example, 500 milliseconds) by which the end point of the read area time range is adjusted. The processor 122 may execute instructions and generate control signals for determining an active read area timeframe. The active read area timeframe represents the combination of the pre-read offset, the read area time range and the post-read offset. More specifically, the pre-read offset is the amount of time (for example, 500 milliseconds) by which the start point (start trigger timestamp) of the read area time range is adjusted. Similarly, the post-read offset is the amount of time (for example, 500 milliseconds) by which the stop point (stop trigger timestamp) of the read area time range is adjusted. When the value of the pre-read offset is a positive number and the value of the post-read offset is a positive number, the active read area timeframe will be longer than the read area time range, in effect "virtually" lengthening the reading zone 105 of the physical portal 100. In other words, if the pre-read offset is 500 milliseconds, the active read area timeframe will start 500 milliseconds earlier than the start trigger timestamp. Likewise, if the post-read offset is 500 milliseconds, the active read area timeframe will end 500 milliseconds later than the stop trigger timestamp. If both the pre-read offset and the post-read offset are each a negative value, the active read area timeframe will be shorter than the read area time range, in effect "virtually" shortening the reading zone 105 defined by the physical portal 100. If the pre-read offset is a negative value, the start point of the active read area timeframe will be later in time than the start point of the read area time range. Similarly, if the post-read offset is a negative value the stop point of the active read area timeframe will occur sooner than that of the read area time range.

The controller 118 is further configured to associate one or more articles in the plurality with the first group if the read timestamp for the article occurred during the active read area timeframe. The controller 118 may be further configured to remove duplicate RFID code data from the group. The controller 118 may be further configured to process RFID code data for the group and to transmit the result of the processing to an output interface 120, for example a display 124, or a payment system for registering and calculating transactions at a point of sale (such as cash register 122), or an inventory system for registering articles in inventory or in a process.

In some embodiments, the controller 118 may be further configured to receive information from distance sensors 128 indicative of the position of a carrier, and may be configured to compare information with the start trigger timestamp or the stop trigger timestamp to identify and remove RFID code data from stray RFID tags that may have been included in the group.

Such instructions may be read into or incorporated into a computer readable medium, such as the memory component 124 or provided external to the processor 122. In alternative embodiments, hard wired circuitry may be used in place of, or in combination with, software instructions to implement a control method.

The term "computer readable medium" as used herein refers to any non-transitory medium or combination of media that participates in providing instructions to the processor 122 for execution. Such a medium may comprise all computer readable media except for a transitory, propagating signal. Common forms of computer-readable media include, for example, a floppy disk, a flexible disk, hard disk, magnetic tape, or any other magnetic medium, a CD-ROM, any other optical medium, or any other computer readable medium.

The controller 118 is not limited to one processor 122 and memory component 124. The controller 118 may include several processors 122 and memory components 124. In an embodiment, the processors 122 may be parallel processors that have access to a shared memory component(s) 124. In another embodiment, the processors 122 may be part of a distributed computing system in which a processor 122 (and its associated memory component 124) may be located remotely from one or more other processor(s) 122 (and associated memory components 124) that are part of the distributed computing system.

The controller 118 may also be configured to retrieve from the memory component 124 and formulas and other data necessary for the calculations discussed herein.

The invention has been disclosed in connection with certain embodiments and examples that are intended to be illustrative rather than limiting. The invention is not limited to the structures and features used as examples. Reference should be made to the appended claims rather than the foregoing examples, to assess the scope of exclusive rights that are claimed.

In addition to the foregoing aspects and embodiments, the portal apparatus advantageously is structured and configured to discern the ID codes of multi-read RFID tags on items in bags or containers. One example is RFID tags on garments or other textile articles in a cart pushed by a human simply while walking thru the portal. In a laundry arrangement or the like, the tags in a cart could number up to thousands, but often are 500 or fewer.

In some embodiments, a variable speed conveyor control can be linked to the controller 118 to selectively control the residence time in the RFID Observable Area. In some embodiments, RF power levels are selectable in a range or in a set of plural optional power levels. The power level is advantageously varied to complement the size of tag (smaller tags being more difficult to discern than larger ones), the quantity and density of tags, based either on a predicted time needed or based on a detected attribute such as the success rate experienced when reading a subset of the tags at the very beginning of a read operation.

In some embodiments with walk-through human ambulation (such as carrying a bag of tagged articles or pushing a wheeled cart or the like), residence time may be varied by signaling the human to stop/start/speed up or slow down, again based on predicted time needed or empirically by the time taken to read a subset.

The disclosed configurations are especially effective with RFID tagged textile items such as cyclically processed laundry. Laundry tags are small and have very small antenna and laundry items are densely disposed in bags, slings or carts. For manually moved groups, visible or audio signaling (especially LED lights) can signal the person walking thru to set or change pace. Thus, if the number or density of tags changes from time to time, the signaling can dictate to slow down (yellow), go or speed up (green), or pause/stop (red).

Also disclosed is a method for multi-reading RFID tags carried by articles is disclosed. The method may comprise receiving by a portal a plurality of articles, each article including an RFID tag; receiving, by a controller, RFID code data and an associated read timestamp for each article; receiving a start trigger timestamp and a stop trigger timestamp; determining a read area time range based on the start trigger timestamp and the stop trigger timestamp; determining an active read area timeframe based on the read area time range as adjusted by a pre-read offset and a post-read offset; associating RFID code data with a first group of the plurality of articles if the read timestamp associated with the RFID code data occurred during the active read area timeframe; processing the RFID code data with the first group; and transmitting a result of the processing of the first group to an output interface.

INDUSTRIAL APPLICABILITY

Figure 17:
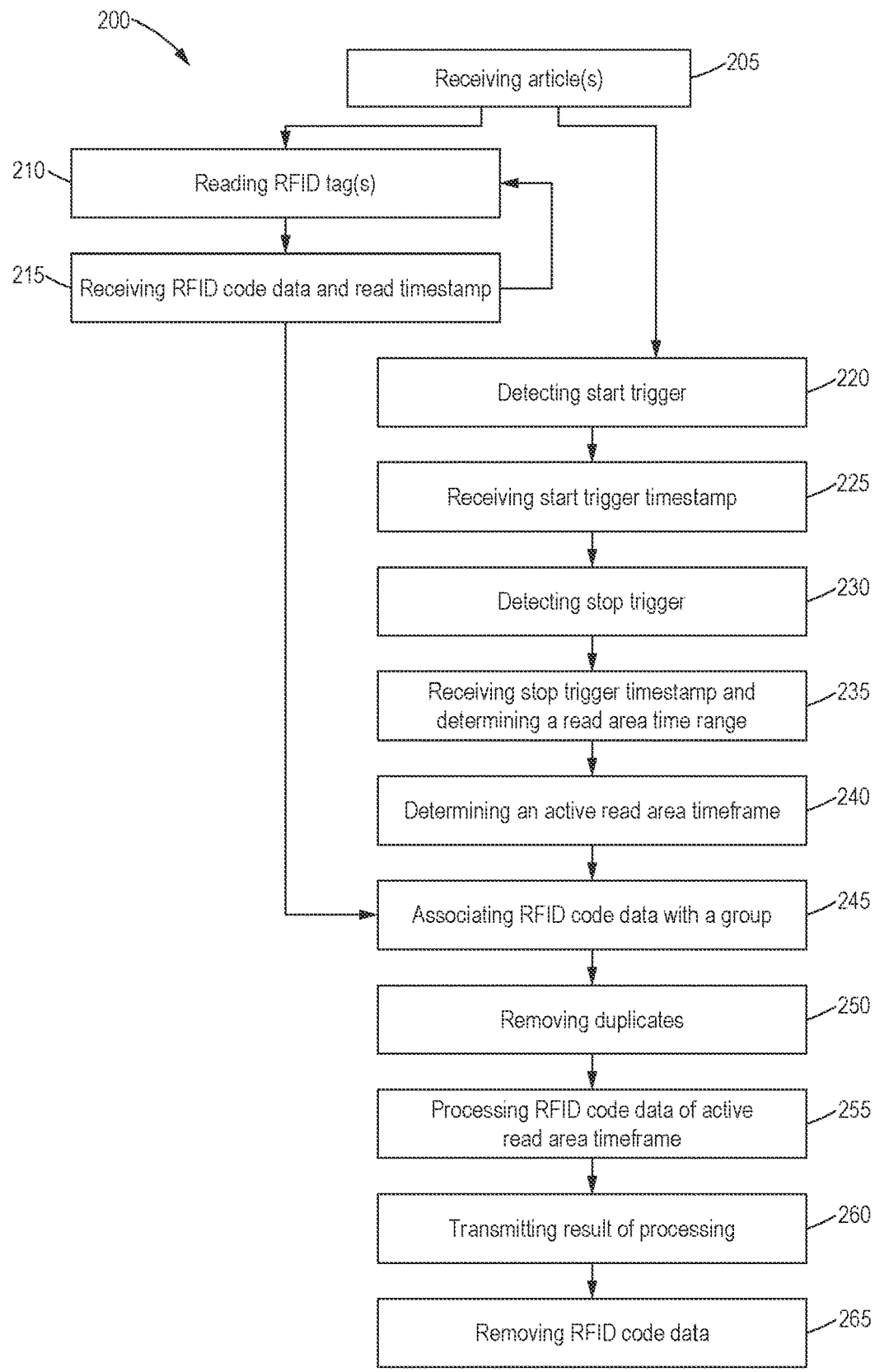
FIG. 17 is a flowchart illustrating exemplary blocks of a method for reading RFID tags carried by articles.

FIG. 17 is an exemplary flowchart that shows blocks of a method 200 for multi-reading RFID codes carried by articles. Pluralities of articles may be in carriers (e.g., carts, bins or the like) queued in front of the inlet 103 to the reading zone 105 of the portal 100. Alternatively, articles may be individually queued in front of the inlet 103, for example a large item too big to fit in a carrier. In some embodiments, at least a portion of the articles may be within the RFID Observable Area, or queued in front of such area.

Block 205 includes receiving by a portal 100 a plurality of articles, each article including an RFID tag having RFID tag information.

In block 210, the RFID reader 116 receives (from the RFID antenna 104) and reads RFID tag information carried by an article of the plurality (present in the RFID Observable Area 132), and generates RFID code data based on the RFID tag information and associates a read timestamp with the RFID code data. The read timestamp is the time at which the RFID reader 116 read the RFID tag information. The RFID reader 116 then transmits, or provides, to the controller 118 the RFID code data, which is based on the RFID tag information, and the read timestamp.

In block 215, the controller 118 receives the RFID code data and read timestamp and places the RFID code data and read timestamp in a buffer 126. Blocks 205 and 210 are repeated continuously so long as there is/are RFID tag(s) present in the RFID Observable Area 132 (resulting in RFID tag information to be read).

In block 220, an entrance sensor 112 detects a start trigger, namely the presence of a group of articles (e.g., via detection of the carrier of the group) or the presence of the first article of the group at the inlet 103 (entrance) of the reading zone 105. The entrance sensor 112 transmits or provides to the controller 118 data indicating detection of the start trigger at the inlet 103 of the reading zone 105 and the start trigger timestamp.

In block 225, the controller 118 receives the start trigger timestamp from the entrance sensor 112.

In block 230 an exit sensor 114 detects a stop trigger, namely the exit from the reading zone 105 (or presence at the outlet 106 of the reading zone) of the group of articles (e.g., via detection of the carrier of the group) or the presence of the last article in the group. The exit sensor 114 transmits or provides to the controller 118 data indicating detection of the stop trigger at the outlet 106 of the reading zone 105 and A stop trigger timestamp.

In block 235 the controller 118 receives the stop trigger timestamp and determines a read area time range based on the start trigger timestamp and the stop trigger timestamp.

In block 240 the controller 118 determines an active read area timeframe for the group of articles. The active read area timeframe is the read area time range that may be adjusted by a pre-read offset and a post-read offset. In an embodiment, the pre-read offset may be retrieved by the controller 118 from memory 124. In an embodiment, the post-read offset may be retrieved by the controller 118 from memory 124.

In block 245 the controller 118 associates RFID code data with a group (of articles) if the read timestamp associated with the RFID code data occurred during the active read area timeframe for the group. In some embodiments, the controller 118 may use information provided by one or more distance sensors 128 to identify and remove RFID code data of stray RFID tags.

In block 250, the controller 118 determines whether there is duplicate RFID code data in the group. If yes, the duplicate RFID code data is removed from the group by the controller 118.

In block 255 the controller 118 processes the RFID code data of each article associated with the group.

In block 260 the controller 118 transmits the result of the processing of RFID code data of each article associated with the group to an output interface 120.

In block 265, the controller 118 removes RFID code data from the memory buffer 126 if the read timestamp associated with the RFID code data occurred earlier than the pre-read timeframe.

From the foregoing, it will be appreciated that while only certain embodiments have been set forth for the purposes of illustration, alternatives and modifications will be apparent from the above description to those skilled in the art. These and other alternatives are considered equivalents and within the spirit and scope of this disclosure and the appended claims.

What is claimed is:

1. A system for multi-reading Radio Frequency Identification (RFID) tags carried by articles, the system comprising:
   a portal having a reading zone disposed between an inlet and an outlet of the reading zone, the portal configured to receive a plurality of articles, each article including an RFID tag;
   a RFID reader configured to read the RFID tag of each article and transmit to a controller: (a) RFID code data that is based on the RFID tag, and (b) a read timestamp representative of the time that the RFID tag was read;
   an entrance sensor configured to detect a start trigger and transmit a start trigger timestamp to the controller, the start trigger timestamp indicative of the entrance into the reading zone of a first group of the plurality of articles; and
   an exit sensor configured to detect a stop trigger and transmit a stop trigger timestamp to the controller, the stop trigger timestamp indicative of the exit of the first group from the reading zone; and
   the controller in operable communication with the RFID reader, the entrance sensor, the exit sensor, and an output interface, the controller configured to:
   receive the RFID code data and the read timestamp for each article;
   receive the start trigger timestamp and the stop trigger timestamp;
   determine a read area time range based on the start trigger timestamp and the stop trigger timestamp;
   determine an active read area timeframe based on the read area time range as adjusted by at least one of a pre-read offset of time and a post-read offset of time to virtually change a length of the reading zone;
   associate RFID code data with the first group when the read timestamp associated with the RFID code data occurred during the active read area timeframe; and
   process the RFID code data of the first group and transmit a result of the processing of the first group to an output interface.

2. The system of claim 1, wherein at least some of the RFID code data received by the controller is generated from an RFID tag disposed outside the portal in a Bleed Area.

3. The system of claim 1, wherein the RFID reader is in an Active State during operation of the system.

4. The system of claim 1, in which the stop trigger is indicative of when a carrier containing the first group exits the reading zone.

5. The system of claim 1, in which the start trigger is indicative of when a carrier containing the first group enters the reading zone.

6. The system of claim 1, wherein the active read area timeframe is a longer duration than the read area time range.

7. The system of claim 1, the output interface is a display or a payment system.

8. The system of claim 1, wherein the RFID reader is continuously in an Active State and RFID tags are interrogated and read within an RFID Observable Area that is different in size that the reading zone.

9. The system of claim 8, wherein the RFID Observable Area includes the reading zone and areas outside the reading zone in which the RFID antennas interrogate and discern the RFID tag.

10. The system of claim 9, wherein the controller associates the RFID code data from the RFID tag interrogated and read within the RFID Observable Area during the pre-read offset portion or the post-read offset portion of the active read area timeframe with the first group.

11. The system of claim 1, wherein the controller is further configured to:
   identify any duplicate RFID code data read before the start trigger time stamp and during the pre-read offset portion of the active read area; and
   filter out the duplicate RFID code data from the first group.

12. A method for multi-reading Radio Frequency Identification (RFID) tags carried by articles, the method comprising:
   receiving by a portal a plurality of articles, each article including an RFID tag;

receiving, by a controller, information from the RFID tag of each of the plurality of articles as read from a RFID reader, the information includes: (a) the RFID code data based on the RFID tag, and (b) a read time stamp representative of a time that the RFID tag was read;

detecting a start trigger and transmitting an associated start trigger timestamp to the controller, the start trigger timestamp indicative of the entrance into a reading zone of a first group of the plurality of articles; and detecting a stop trigger and transmitting an associated stop trigger timestamp to the controller, the stop trigger timestamp indicative of the exit of the first group from the reading zone;

determining a read area time range based on the start trigger timestamp and the stop trigger timestamp;

determining an active read area timeframe based on the read area time range as adjusted by at least one of a pre-read offset of time and a post-read offset of time to virtually change a length of the reading zone;

associating RFID code data with the first group of the plurality of articles when the read timestamp associated with the RFID code data occurred during the active read area timeframe;

processing the RFID code data with the first group after the identifying; and transmitting a result of the processing of the first group to an output interface.

13. The method according to claim 12 further comprising: placing RFID code data in a buffer prior to the processing.

14. The method according to claim 13 further comprising: after the processing, when the read timestamp associated with RFID code data occurred on or after a start point of the read area time range, removing from the buffer the RFID code data.

15. The method according to claim 12, wherein the RFID reader is in an Active State during the method.

16. The method according to claim 12, wherein at least some of the RFID code data received by the controller is generated from an RFID tag disposed outside the portal in a Bleed Area.

17. A computer program product comprising a non-transitory computer usable medium having a computer readable program code embodied therein, the computer readable program code adapted to be executed to implement a method for multi-reading Radio Frequency Identification (RFID) tags carried by articles, the method comprising:

receiving, by a controller, RFID code data and a read timestamp associated with the RFID code data, as read from a RFID reader, for each of the articles received in a portal;

detecting a start trigger and transmitting an associated start trigger timestamp to the controller, the start trigger timestamp indicative of the entrance into a reading zone of a first group of the plurality of articles; and detecting a stop trigger and transmitting an associated stop trigger timestamp to the controller, the stop trigger timestamp indicative of the exit of the first group from the reading zone;

determining a read area time range based on the start trigger timestamp and the stop trigger timestamp; determining an active read area timeframe based on the read area time range as adjusted by at least one of a pre-read offset of time and a post-read offset of time to virtually change a length of the reading zone;

associating the RFID code data with the first group of articles when the read timestamp occurred during the active read area timeframe;

processing the RFID code data of the first group; and transmitting a result of the processing of the first group to an output interface.

18. The computer program product of claim 17, the method further comprising: placing RFID code data in a buffer prior to the processing.

19. The computer program product of claim 18, the method further comprising: after the processing, removing from the buffer RFID code data associated with a read timestamp that occurred after a start point of the read area time range.

20. The computer program product of claim 18, wherein the active read area timeframe is longer than the read area time range.

* * * * *